(12) United States Patent
Murota

(10) Patent No.: US 6,289,105 B1
(45) Date of Patent: Sep. 11, 2001

(54) METHOD AND APPARATUS FOR ENCRYPTING AND TRANSFERRING ELECTRONIC MAILS

(75) Inventor: Masao Murota, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 08/690,169

(22) Filed: Jul. 26, 1996

(30) Foreign Application Priority Data

Jul. 28, 1995 (JP) .................................................. 7-193447

(51) Int. Cl.[7] .............................. H04L 9/08; H04L 12/22
(52) U.S. Cl. ......................... 380/286; 380/282; 380/285; 713/152; 713/160
(58) Field of Search ............................... 380/21, 49, 286, 380/282, 285; 379/100.08, 93.24; 455/412; 709/206, 207; 713/152, 167, 176, 181

(56) References Cited

U.S. PATENT DOCUMENTS

| | | | |
|---|---|---|---|
| 5,369,707 | * | 11/1994 | Follendore, III ..................... 713/155 |
| 5,495,533 | * | 2/1996 | Linehan ................................. 380/21 |
| 5,548,646 | * | 8/1996 | Aziz et al. ........................... 713/153 |
| 5,557,346 | * | 9/1996 | Lipner et al. ........................ 380/286 |
| 5,721,777 | * | 2/1998 | Blaze .................................... 380/286 |
| 5,751,813 | * | 5/1998 | Dorenbos .............................. 380/49 |
| 5,764,772 | * | 6/1998 | Kaufman ............................... 380/30 |
| 6,055,634 | * | 4/2000 | Severwright ......................... 713/164 |

OTHER PUBLICATIONS

Bruce Schneier, Applied Cryptography, book, p. 48, Oct. 1996.*

Bruce Schneier, "E–mail Security", John Wiley and Sons, N.Y. (1995) pp. 38–44, pp. 170–175 (PGP) and pp. 259–260 (Section 4.5, PEM).*

Dorothy E. Denning and Dennis K. Branstrad, "A Taxonomy of Key Escrow Encryption Systems" Communications of the ACM, New York Mar. 1996, vol. 39, No. 3, pp. 34–40.*

Stephen T. Walker et al., "Commercial Key Recovery" Communications of the ACM, New York Mar. 1996, vol. 39, No. 3, pp. 41–47.*

David Paul Maher, "Crypto Backup and Key Escrow" Communications of the ACM, New York Mar. 1996, vol. 39, No. 3, pp. 48–53.*

Ravi Ganesan, "The Yaksha Security System" Communications of the ACM, New York Mar. 1996, vol. 39, No. 3, pp. 55–60.*

Denning et al., "Key Escrowing Today", IEEE Communication Magazine, (1994) pp. 58–68.

Linn, "Privacy Enhancement for Internet Electronic Mail: Part I: Message Encryption and Authentication Procedures", (1993) pp. 1–42.

* cited by examiner

*Primary Examiner*—Gilberto Barrón, Jr.
*Assistant Examiner*—James Seal
(74) *Attorney, Agent, or Firm*—Foley & Lardner

(57) ABSTRACT

A scheme for encrypting and transferring electronic mails which enables the realization of the information management regarding encrypted electronic mails by an electronic mail manager, and the transfer control regarding encrypted electronic mails. A management encryption key information is produced by encrypting the message encrypting key according to a public-key cryptography by using a prescribed management public key, in addition to the usual sender's encryption key information and each receiver's encryption key information. The encrypted electronic mail is then constructed from the encrypted message, the sender's encryption key information, each receiver's encryption key information and the management encryption key information. At a time of transferring the electronic mail, whether this electronic mail is an encrypted electronic mail or not is identified and whether a transfer of this electronic mail is permitted or not is judged according an identification result.

14 Claims, 18 Drawing Sheets

METHOD AND APPARATUS FOR ENCRYPTING AND TRANSFERRING ELECTRONIC MAILS

BACKGROUND OF THE INVENTION

1. Field of the Invention

The present invention relates to a method and an apparatus for encrypting and transferring electronic mails, which realize an information management and a transfer control regarding encrypted electronic mails.

2. Description of the Background Art

In conjunction with spread of computer networks, electronic mails are becoming widely used. In addition, an electronic mail encryption apparatus has been developed to meet demands for transferring secret information in forms of electronic mails.

Conventionally, the electronic mail encryption apparatus has been realized in schemes such as PEM (Privacy Enhanced Mail) and PGP (Pretty Good Privacy). In the following, a conventional procedure for encrypting electronic mails will be described.

First, an encryption key of the secret-key cryptography is generated, and an electronic mail message is encrypted by using this encryption key according to the secret-key cryptography. Then, the encryption key used for encrypting message is encrypted by using respective public keys of a sender and a receiver of the electronic mail according to the public-key cryptography, to produce a sender's encryption key information and a receiver's encryption key information. When there are more than one receivers, the encryption key information for each one of these receivers is produced. Then, the encrypted message, a prescribed number of receiver's encryption key information, and the sender's encryption key information are transmitted as an encrypted electronic mail.

When a receiver or a sender wish to read the encrypted electronic mail which has been encrypted in this manner, the encryption key is obtained first by decrypting the encryption key information assigned to himself by using his own secret key. The secret key to be used here is in pair with the public key used in producing the encryption key information, and only a person who has this secret key can obtain the encryption key by decrypting the encryption key information. After the encryption key is obtained, the message can be decrypted by using this encryption key according to the secret-key cryptography so that it becomes possible to read the message of the electronic mail.

Now, in organizations such as corporations and companies, there are demands for realizing the information management regarding contents of the electronic mails, in order to prevent a leak of secret information to outsiders by means of the electronic mails.

In a case of the electronic mail in which the message is not encrypted, its content can be read by anyone other than the sender and the receiver, so that the information management can be realized by preserving copies of the electronic mails as a log in an apparatus such as an electronic mail transfer apparatus.

However, in a case of the conventional encrypted electronic mail, only the sender and the receiver of this electronic mail can decrypt the encrypted message. Consequently, even when a log preserved in the electronic mail transfer apparatus is checked, the content of the encrypted electronic mail cannot be read by an electronic mail manager, so that it has been impossible to realize the information management.

Moreover, the conventional electronic mail transfer apparatus simply carries out a transfer of the electronic mail by determining intended receivers from a header of the electronic mail upon a request for a transfer of the electronic mail. Consequently, even an encrypted electronic mail which has a highly classified information will be transferred if there is a request for a transfer, so that there remains a possibility of an erroneous transfer, which poses a serious problem from a viewpoint of security.

Thus, the conventional electronic mail encryption apparatus has been associated with a problem that the information management cannot be realized because the electronic mail manager cannot read the content of the electronic mail encrypted by this apparatus.

In addition, the conventional electronic mail transfer apparatus has been associated with a problem from a viewpoint of security because the electronic mail has been transferred unconditionally.

SUMMARY OF THE INVENTION

It is therefore an object of the present invention to provide a method and an apparatus for encrypting electronic mails in which the information management regarding encrypted electronic mails can be realized by a third person other than senders and receivers of encrypted electronic mails.

It is another object of the present invention to provide a method and an apparatus for transferring electronic mails in which the transfer control regarding encrypted electronic mails can be realized.

According to one aspect of the present invention there is provided an electronic mail encryption apparatus, comprising: message encrypting means for encrypting a message of an electronic mail according to a secret-key cryptography by using an encryption key, to produce an encrypted message; encryption key encrypting means for encrypting the encryption key according to a public-key cryptography by using each one of public keys of a sender and receivers of the electronic mail and a prescribed management public key, to respectively produce encryption key information for each one of the sender and the receivers of the electronic mail and a management encryption key information; and encrypted electronic mail constructing means for constructing an encrypted electronic mail by using the encrypted message, the encryption key information for each one of the sender and the receivers of the electronic mail, and the management encryption key information.

According to another aspect of the present invention there is provided a method for encrypting an electronic mail, comprising the steps of: (a) encrypting a message of the electronic mail according to a secret-key cryptography by using an encryption key, to produce an encrypted message; (b) encrypting the encryption key according to a public-key cryptography by using each one of public keys of a sender and receivers of the electronic mail and a prescribed management public key, to respectively produce encryption key information for each one of the sender and the receivers of the electronic mail and a management encryption key information; and (c) constructing an encrypted electronic mail by using the encrypted message produced at the step (a), and the encryption key information for each one of the sender and the receivers of the electronic mail and the management encryption key information produced at the step (b).

According to another aspect of the present invention there is provided an electronic mail transfer apparatus, comprising: identifying means for identifying whether an electronic mail to be transferred is an encrypted electronic mail or not;

judging means for judging whether a transfer of said electronic mail to be transferred is permitted or not according an identification result obtained by the identifying means; and transfer means for transferring said electronic mail to be transferred according to a judgement result obtained by the judging means.

According to another aspect of the present invention there is provided a method for transferring an electronic mail, comprising the steps of: (a) identifying whether an electronic mail to be transferred is an encrypted electronic mail or not; (b) judging means for judging whether a transfer of said electronic mail to be transferred is permitted or not according an identification result obtained by the step (a); and (c) transferring said electronic mail to be transferred according to a judgement result obtained by the step (b).

Other features and advantages of the present invention will become apparent from the following description taken in conjunction with the accompanying drawings.

DETAILED DESCRIPTION OF THE PREFERRED EMBODIMENTS

Referring now to FIG. 1 to FIG. 7, the first embodiment of the present invention which is directed to a method and an apparatus for encrypting electronic mails will be described in detail.

Figure 1:
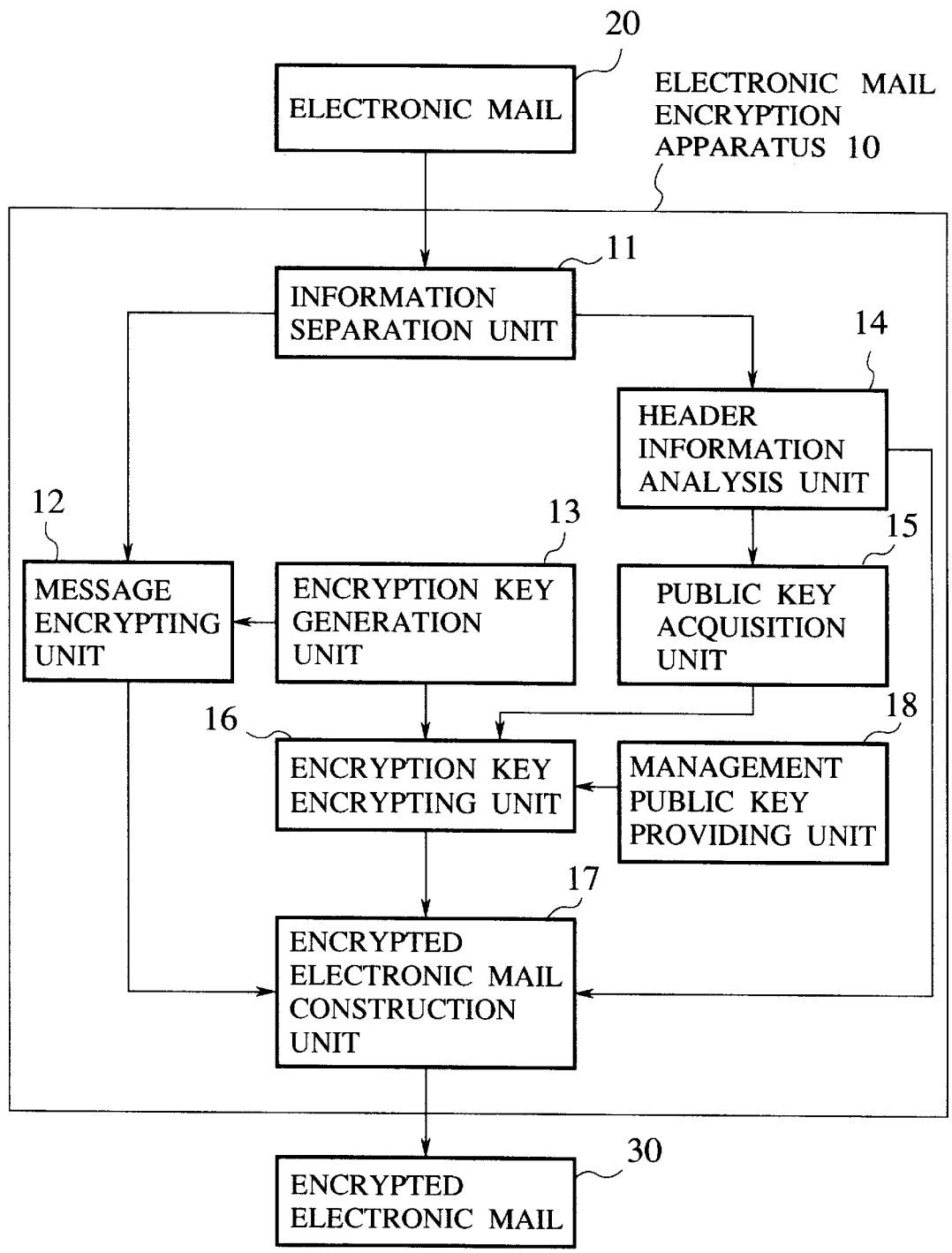
FIG. 1 is a block diagram of an electronic mail encryption apparatus according to the first embodiment of the present invention.

FIG. 1 shows a basic configuration of an electronic mail encryption apparatus 10 according to this first embodiment which encrypts an entered electronic mail 20 and outputs an encrypted electronic mail 30.

This electronic mail encryption apparatus 10 comprises: an information separation unit 11, a message encrypting unit 12 connected with the information separation unit 11; an encryption key generation unit 13 connected with the message encrypting unit 12; a header information analysis unit 14 connected with the information separation unit 11; a public key acquisition unit 15 connected with the header information analysis unit 14; an encryption key encrypting unit 16 connected with the encryption key generation unit 13 and the public key acquisition unit 15; an encrypted electronic mail construction unit 17 connected with the message encrypting unit 12, the encryption key encrypting unit 16, and the header information analysis unit 14; and a management public key providing unit 18 connected with the encryption key encrypting unit 16.

Figure 2:
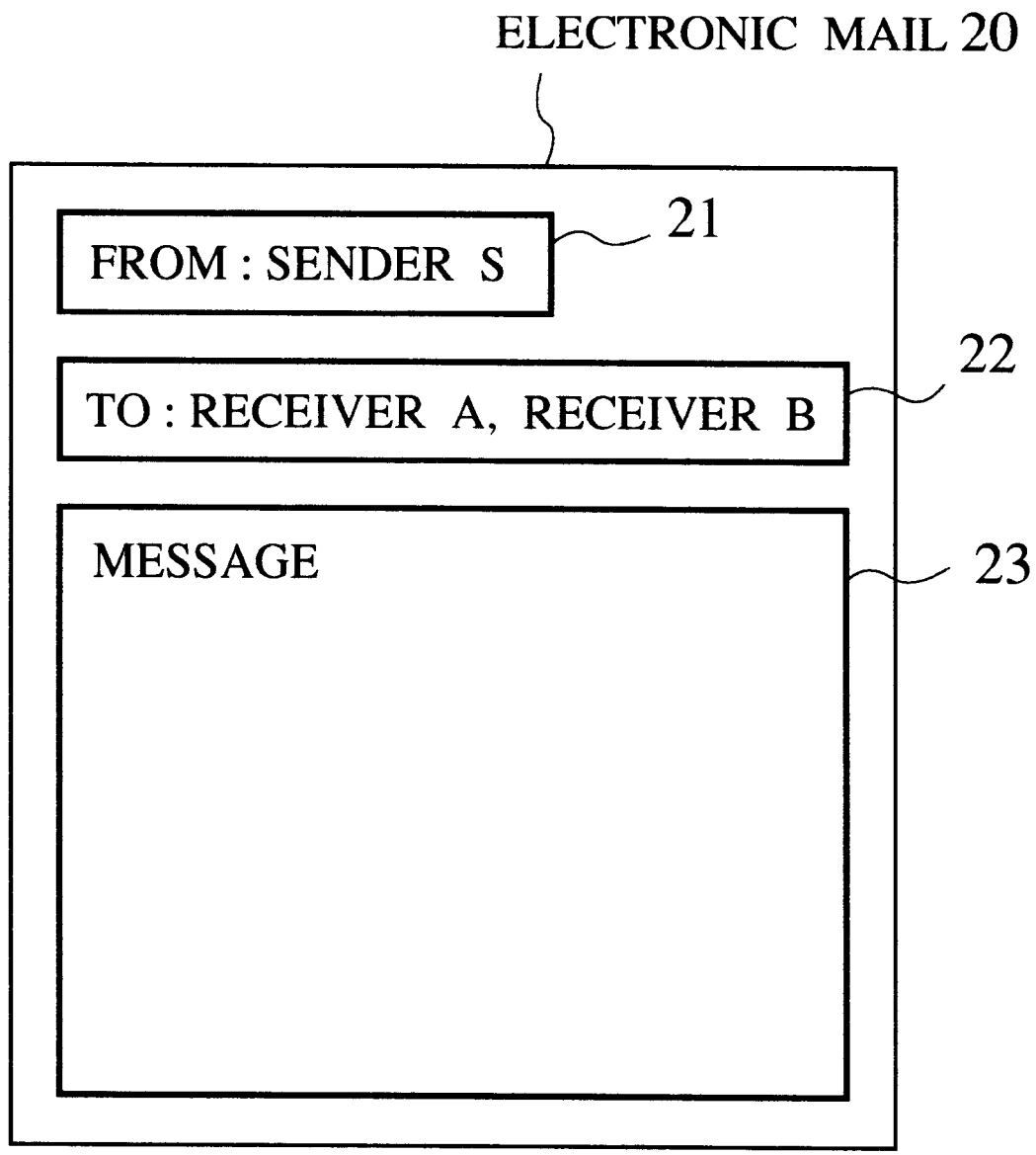
FIG. 2 is a diagram showing a basic structure of an electronic mail entered into the electronic mail encryption apparatus of FIG. 1.

FIG. 2 shows a basic structure of an electronic mail 20 to be encrypted by the electronic mail encryption apparatus of FIG. 1. This electronic mail 20 comprises a header information and a message 23. In an exemplary structure shown in FIG. 2, the header information includes a sender information 21 indicating a sender of this electronic mail 20, and a receiver information 22 indicating receives of this electronic mail 20. The electronic mail 20 shown in FIG. 2 indicates that it is destined from a sender S to receivers A and B.

Figure 3:
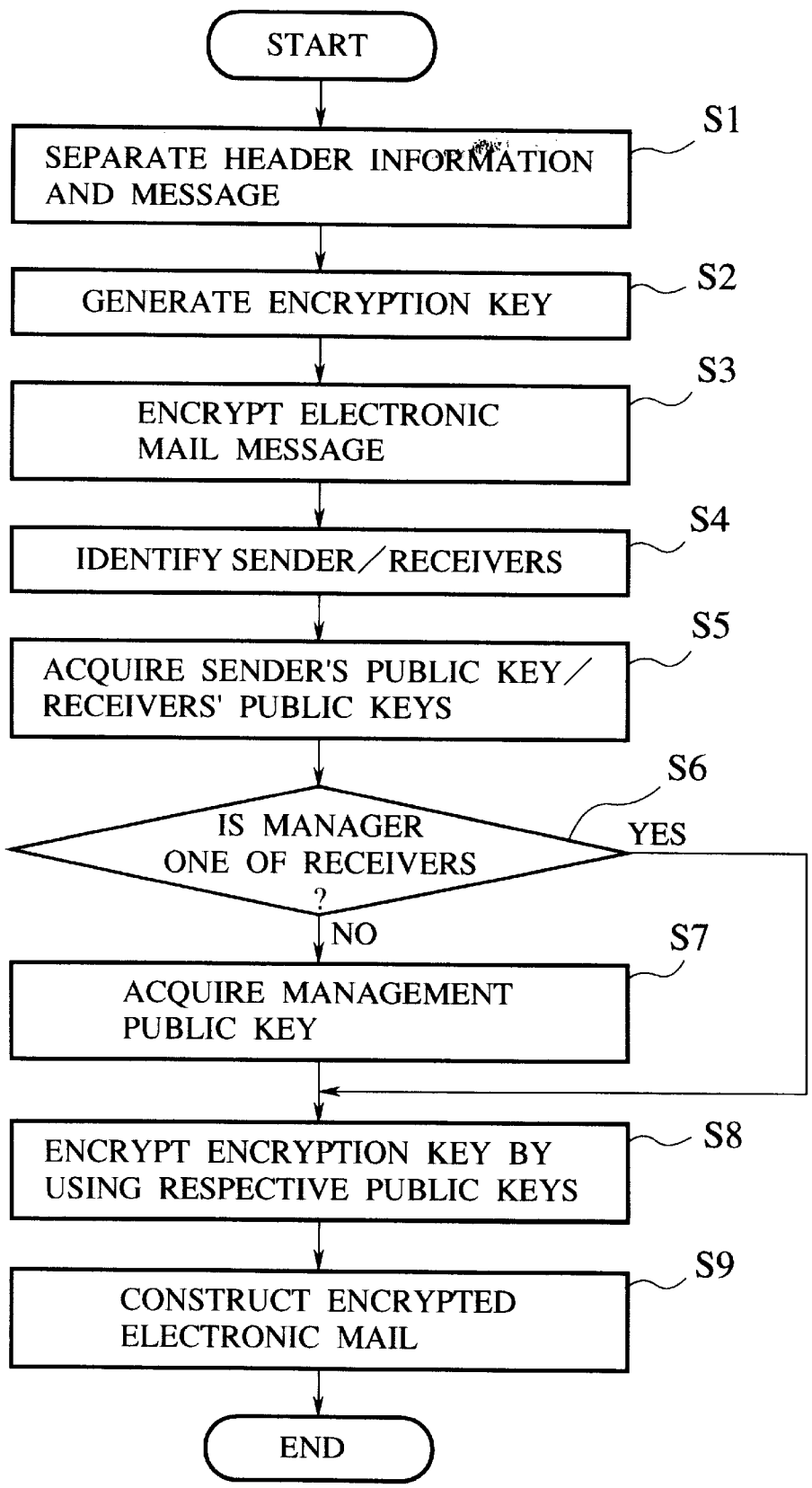
FIG. 3 is a flow chart for one exemplary procedure of an electronic mail encryption processing to be carried out by the electronic mail encryption apparatus of FIG. 1.

FIG. 3 shows an exemplary procedure for an electronic mail encryption processing to be carried out by the electronic mail encryption apparatus 10 shown in FIG. 1, which proceeds as follows.

The electronic mail 20 entered into the electronic mail encryption apparatus 10 Is separated into the message and the header information including the sender information and the receiver information by the information separation unit 11 (step S1). The separated message is then given to the message encrypting unit 12, while the separated header information is given to the header information analysis unit 14.

The encryption key generation unit 13 generates an encryption key of the secret-key cryptography which is to be used for encrypting the message (step S2). The generated encryption key is then given to the message encrypting unit 12 and the encryption key encrypting unit 16.

The message encrypting unit 12 encrypts the message by using this encryption key according to the secret-key cryptography (step S3). Here, for the secret-key cryptography, the known scheme such as DES (Data Encryption Standard) for example can be used. The encrypted message is then given to the encrypted electronic mail construction unit 17.

The header information analysis unit 14 analyzes the header information to identify a sender from the sender information and receivers from the receiver information (step S4). Then, this analysis result (which indicates the sender S, the receiver A, and the receiver B in a case of the electronic mail of FIG. 2) is given to the public key acquisition unit 15. In addition, the header information itself is given to the encrypted electronic mail construction unit 17.

When the information on a sender and receivers is given from the header information analysis unit 14, the public key acquisition unit 15 acquires respective public keys of the sender and the receivers (step S5). The public keys may be acquired from a local database which stores the public keys in advance, or from a server for providing the public keys through a network. The acquired public keys are then given to the encryption key encrypting unit 16.

Also, the management public key providing unit 18 gives a management public key, which is defined in advance for the purpose of electronic mail management, to the encryption key encrypting unit 16. The management public key may be stored in the management public key providing unit 18 in advance, or acquired by the management public key providing unit 18 from elsewhere (step S7).

Here, however, when a manager is one of the receivers according to the receiver information in the header information of the entered electronic mail 20, the management public key is already acquired by the processing of the step S5 described above, so that this processing to acquire the management public key from the management public key providing unit 18 can be skipped (step S6).

The encryption key encrypting unit 16 encrypts the encryption key generated by the encryption key generation unit 13 according to the public-key cryptography, by using each of the public keys of the receivers and the public key of the sender given from the public key acquisition unit 15 and the management public key given from the management public key providing unit 18, so as to produce each receiver's encryption key information, a sender's encryption key information, and a management encryption key information, respectively (step S8). Here, for the public-key cryptography, the known scheme such as RSA scheme for example can be used. Each encryption key information generated by the encryption key encrypting unit 16 is then given to the encrypted electronic mail construction unit 17.

The encrypted electronic mail construction unit 17 constructs the encrypted electronic mail 30 of a prescribed format by using the encrypted message given from the message encrypting unit 12, the receiver's encryption key information, the sender's encryption key information, and the management encryption key information given from the encryption key encrypting unit 16, and the header information given from the header information analysis unit 14 (step S9), and outputs the constructed encrypted electronic mail 30.

Figure 4:
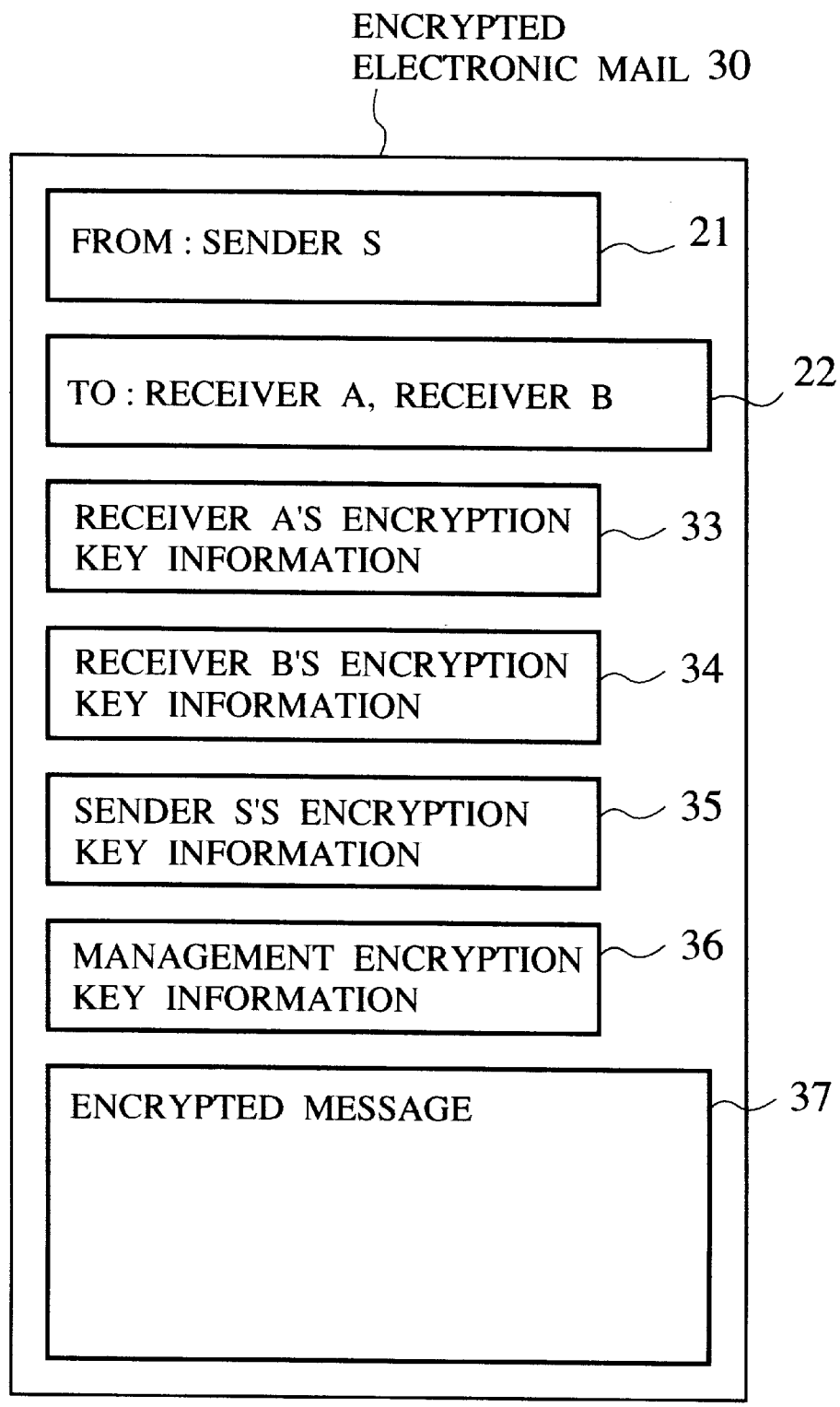
FIG. 4 is a diagram showing a structure of an encrypted electronic mail obtained by the electronic mail encryption apparatus of FIG. 1.

FIG. 4 shows a structure of the encrypted electronic mail 30 obtained by encrypting the electronic mail 20 of FIG. 2 according to the electronic mail encryption processing described above. In FIG. 4, the encrypted electronic mail 30 comprises: the header information including the sender information 21 and the receiver information 22; the electronic mail message encryption key information including a receiver A's encryption key information 33, a receiver B's encryption key information 34, a sender S's encryption key information 35, and a management encryption key information 36; and an encrypted message 37.

The sender information 21 and the receiver information 22 are the same (plain text) as in the electronic mail 20 of FIG. 2. The receiver A's encryption key information 33 describes an information obtained by encrypting the message encryption key according to the public-key cryptography by using the receiver A's public key, while the receiver B's encryption key information 34 describes an information obtained by encrypting the message encryption key according to the public-key cryptography by using the receiver B's public key. The sender S's encryption key information 35 describes an information obtained by encrypting the message encryption key according to the public-key cryptography by using the sender S's public key, while the management encryption key information 36 describes an information obtained by encrypting the message encryption key according to the public-key cryptography by using the management public key.

The receiver of the electronic mail can obtain the encryption key of the electronic mail message by decrypting his own encryption key information by using the secret key in his own possession, and decrypt the electronic mail message by using the encryption key so obtained.

Consequently, those who can read the encrypted electronic mail 30 of FIG. 4 which is encrypted by the electronic mail encryption apparatus 10 of FIG. 1 are limited only to the sender S, the receiver A and the receiver B of the electronic mail 20 of FIG. 2, and the manager who has a management secret key.

The encrypted electronic mail 30 that can be obtained by the electronic mail encryption apparatus 10 of this first embodiment is characterized in that the encrypted electronic mail 30 can be decrypted by the manager who is a third person other than the sender and the receivers of the electronic mail. In other words, it becomes possible for the manager to check the content of the encrypted electronic mail 30, and therefore it becomes possible to realize the information management of the electronic mails.

Thus the electronic mail encryption apparatus of this first embodiment can be used effectively in realizing the information management of the electronic mails by the organizations such as corporations and companies.

In addition, according to this first embodiment, there is an advantage in that the information management of the encrypted electronic mails by a third person can be realized without largely changing the framework of the conventional encrypted electronic mails.

Note here that the electronic mail encryption processing to be carried out by the electronic mail encryption apparatus 10 of this first embodiment is not necessarily limited to that shown in FIG. 3 described above, and can be modified in various ways.

Figure 5:
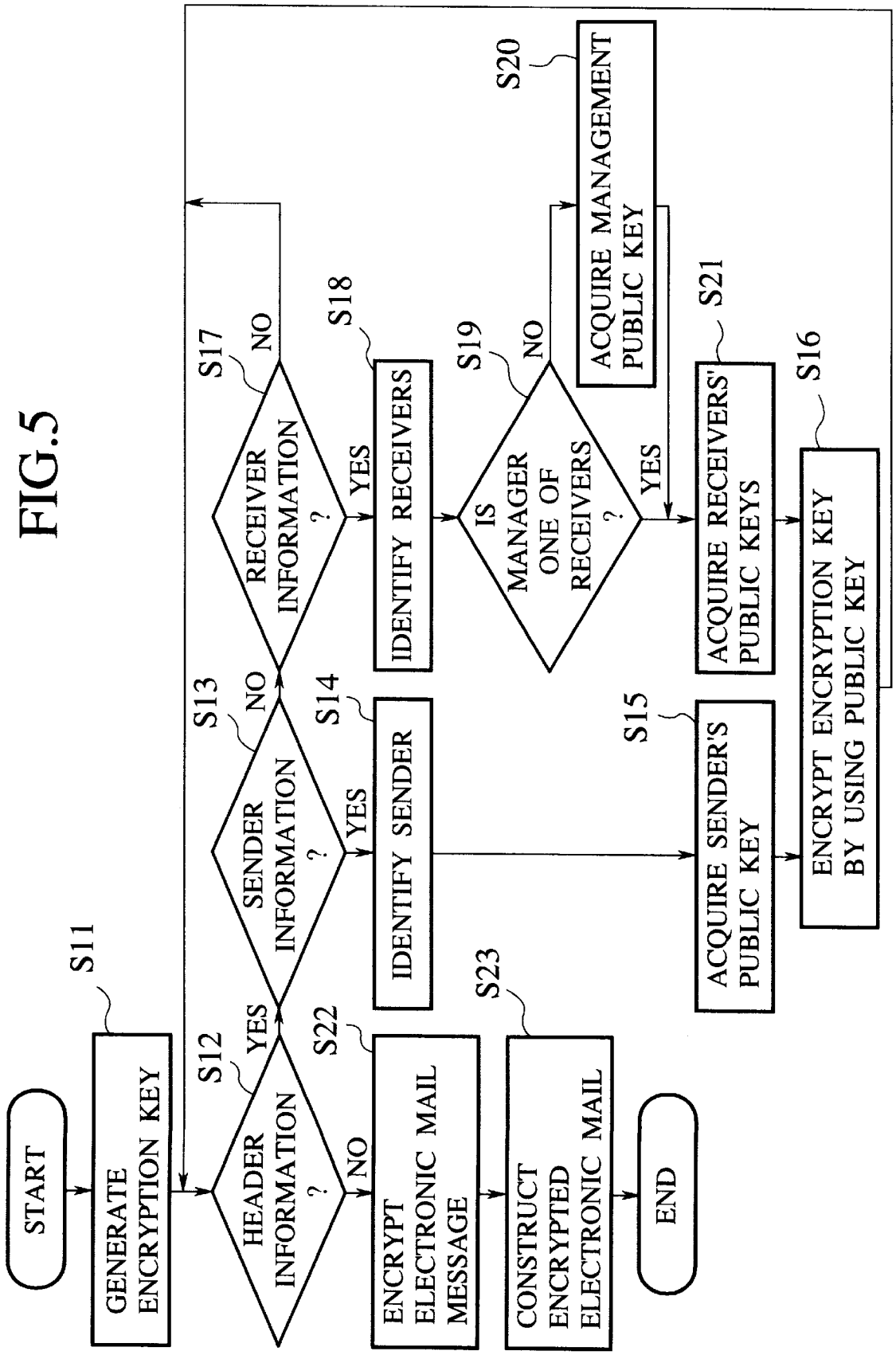
FIG. 5 is a flow chart for another exemplary procedure of an electronic mail encryption processing to be carried out by the electronic mail encryption apparatus of FIG. 1.

For example, FIG. 5 shows another exemplary procedure for an electronic mail encryption processing to be carried out by the electronic mail encryption apparatus 10 shown in FIG. 1. This procedure of FIG. 5 differs from that of FIG. 3 only in an order of processings.

More specifically, in FIG. 3, after the encryption key is generated (step S2), the electronic mail message is encrypted first (step S3). In contrast, in FIG. 5, after the encryption key is generated (step S11), a type of information to be processed is judged as the header information (step S12), or the sender information (step S13), or the receiver information (step S17). Then, the electronic mail message is encrypted (step S22) immediately before the construction of the encrypted electronic mail in a prescribed format (step S23). Also, in FIG. 3, the sender and the receivers are identified together at once (step S4), the public keys of the sender and the receivers are obtained together at once (step S5), and the message encryption key is encrypted by using the respective public keys together at once (step S8). In contrast, in FIG. 5, the identification of the sender (step S14), the acquisition of the sender's public key (step S15), and the encryption of the message encryption key by using the sender's public key (step S16) are carried out in series, while the identification of the receivers (step S18), the judgement as to whether the manager is one of the receivers or not (step S19), the acquisition of the management public key (step S20) if necessary, the acquisition of the receivers' public keys (step S21), and the encryption of the message encryption key by using each of the receivers' public keys and the management public key (step S16) are carried out in series.

Besides this modification of FIG. 5, many modifications and variations of the procedure of FIG. 3 can be made without departing from the novel and advantageous features of this first embodiment as should be obvious to those skilled in the art. Consequently, the detailed descriptions of all the other possible modifications and variations will be omitted here.

Note also that the electronic mail encryption apparatus of this first embodiment can be realized by hardware, or by software program implementing the above described processing content which is to be installed and executed on a computer.

Figure 6:
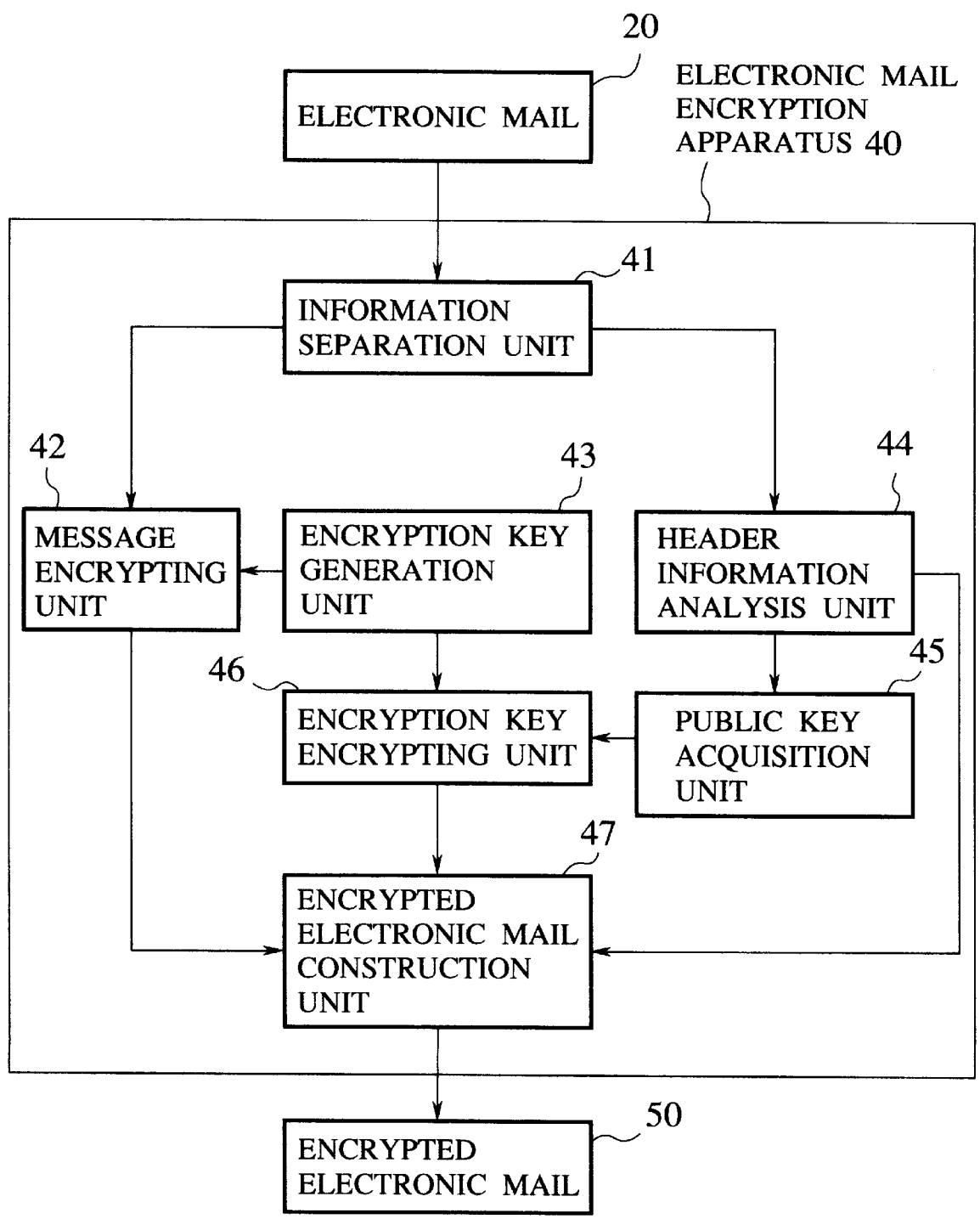
FIG. 6 is a block diagram of a conventional electronic mail encryption on apparatus.

Now, for the sake of comparison, FIG. 6 shows a basic configuration of a conventional electronic mail encryption apparatus 40 which comprises an information separation unit 41, a message encrypting unit 42, an encryption key generation unit 43, a header information analysis unit 44, a public key acquisition unit 45, an encryption key encrypting unit 46, and an encrypted electronic mail construction unit 47. This conventional electronic mail encryption apparatus 40 of FIG. 6 differs from the electronic mail encryption apparatus 10 of FIG. 1 in that the management public key providing unit 18 of FIG. 1 is missing in FIG. 6. Consequently, the encryption key encrypting unit 46 receives only the public keys of the sender and the receivers of the electronic mail, and produce only the encryption key information for the sender and the receivers of the electronic mail.

Figure 7:
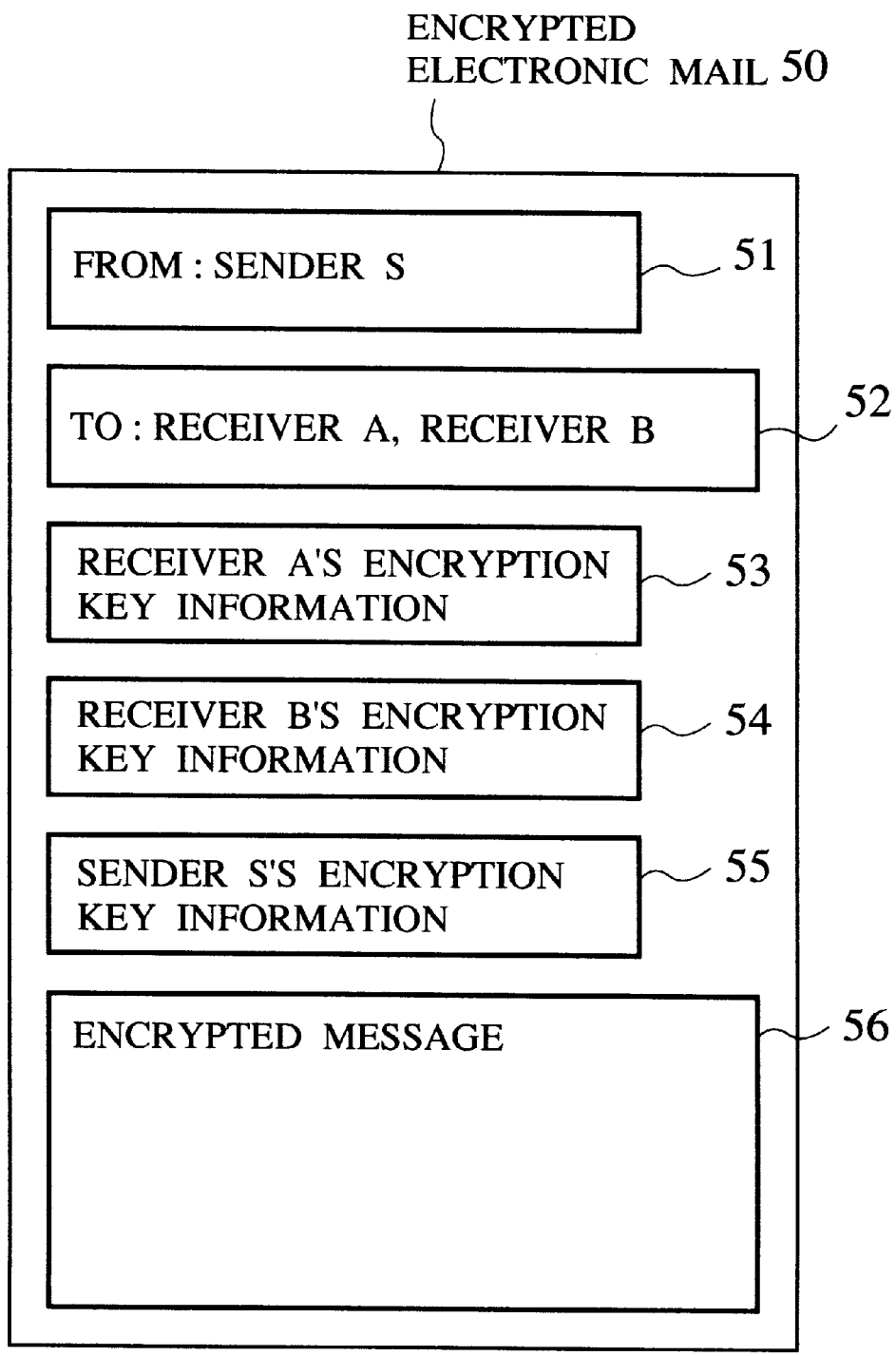
FIG. 7 is a diagram showing a structure of an encrypted electronic mail obtained by the conventional electronic mail encryption apparatus of FIG. 6.

FIG. 7 shows a structure of the encrypted electronic mail 50 obtained by this conventional electronic mail encryption apparatus 40. This encrypted electronic mail 50 of FIG. 7 only contains the header information including the sender information 51 and the receiver information 52; the electronic mail message encryption key information including a receiver A's encryption key information 53, a receiver B's encryption key information 54, and a sender S's encryption key information 55; and an encrypted message 56. Consequently, those who can read the encrypted electronic mail 50 of FIG. 7 which is encrypted by the electronic mail encryption apparatus 40 of FIG. 6 have been limited only to the sender S, the receiver A and the receiver B of the electronic mail. For this reason, it has conventionally been impossible to realize the information management in which the content of the encrypted electronic mail 50 is to be checked by the manager who is a third person other than the sender and the receivers of the electronic mail.

Referring now to FIG. 8 to FIG. 11, the second embodiment of the present invention which is directed to a method and an apparatus for encrypting electronic mails will be described in detail.

Figure 8:
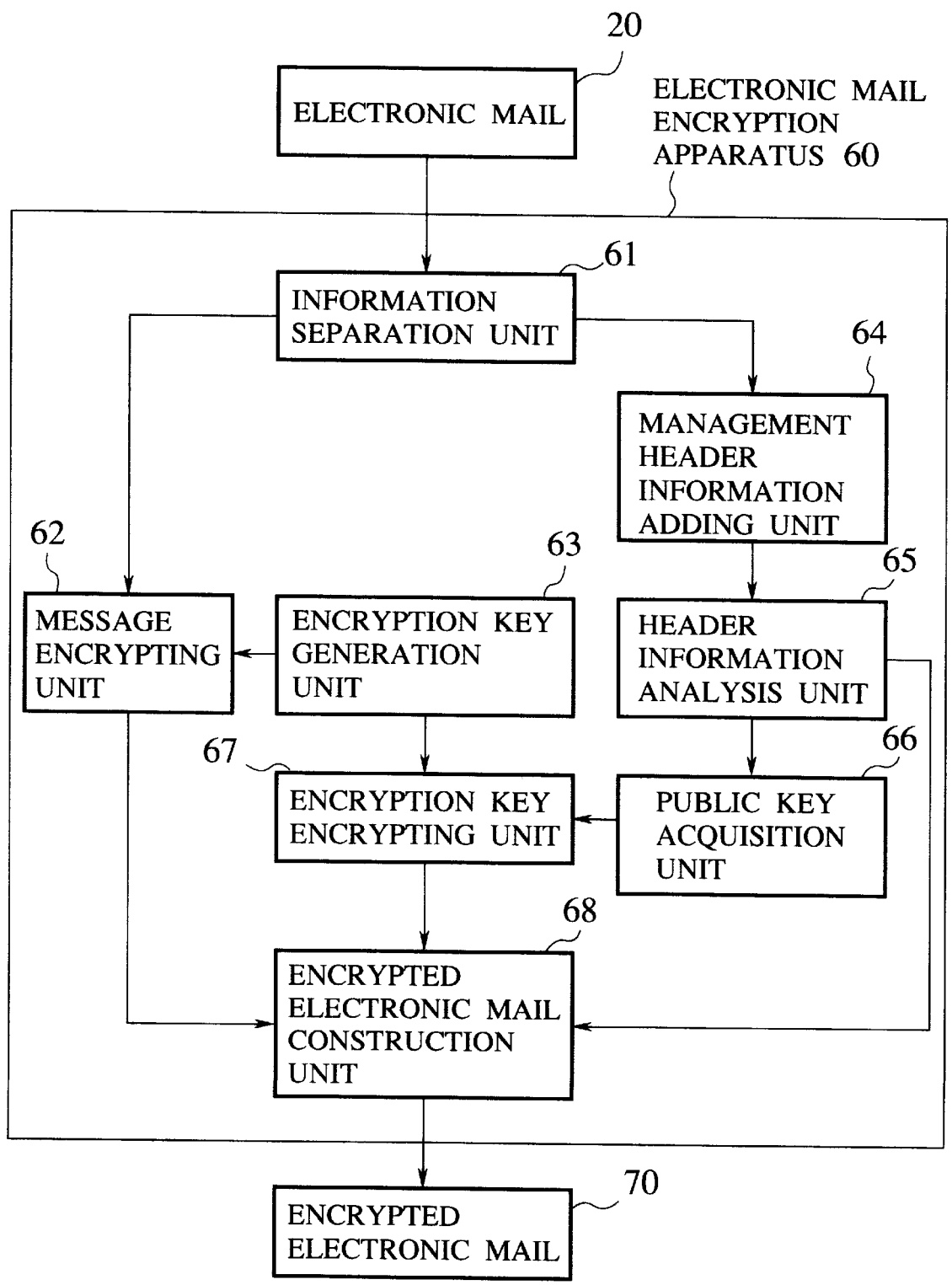
FIG. 8 is a block diagram of an electronic mail encryption apparatus according to the second embodiment of the present invention.

FIG. 8 shows a basic configuration of an electronic mail encryption apparatus 60 according to this second embodiment which encrypts an entered electronic mail 20 and outputs an encrypted electronic mail 70.

In this electronic mail encryption apparatus 60, an information separation unit 61, a message encrypting unit 62, an encryption key generation unit 63, a header information analysis unit 65, a public key acquisition unit 66, an encryption key encrypting unit 67, and an encrypted electronic mail construction unit 68 are substantially similar to the corresponding elements in the configuration of FIG. 1 for the first embodiment described above.

This configuration of FIG. 8 differs from that of FIG. 1 in that a management header information adding unit 64 is additionally provided between the information separation unit 61 and the header information analysis unit 65, while the management public key providing unit 18 of FIG. 1 is omitted instead. Thus the header information separated by the information separation unit 61 is given to the management header information adding unit 64, and then given to the header information analysis unit 65.

Figure 9:
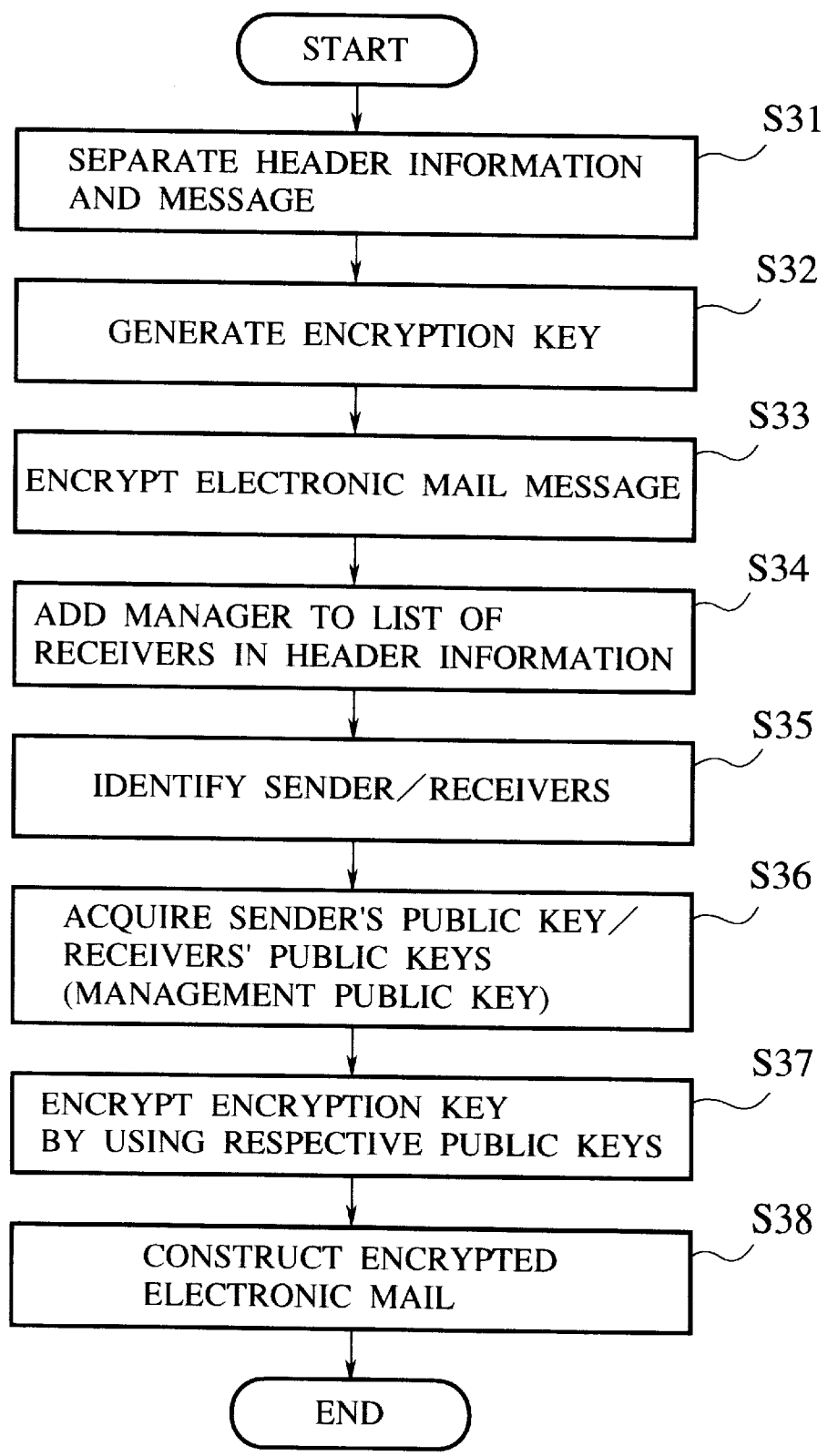
FIG. 9 is a flow chart for one exemplary procedure of an electronic mail encryption processing to be carried out by the electronic mail encryption apparatus of FIG. 8.

FIG. 9 shows an exemplary procedure for an electronic mail encryption processing to be carried out by the electronic mail encryption apparatus 60 shown in FIG. 8, which proceeds as follows.

The electronic mail 20 entered into the electronic mail encryption apparatus 60 is separated into the message and the header information including the sender information and the receiver information by the information separation unit 11 (step S31). The separated message is then given to the message encrypting unit 62, while the separated header information is given to the management header information adding unit 64.

The encryption key generation unit 63 generates an encryption key of the secret-key cryptography which is to be used for encrypting the message (step S32). The generated encryption key is then given to the message encrypting unit 62 and the encryption key encrypting unit 67.

The message encrypting unit 62 encrypts the message by using this encryption key according to the secret-key cryptography (step S33). The encrypted message is then given to the encrypted electronic mail construction unit 68.

The management header information adding unit 64 adds a prescribed electronic mail manager to a list of receivers of the electronic mail in the receiver information of the header information (step S34). In other words, the receiver information 22 of the electronic mail 20 registers the receiver A, the receiver B, and the manager at this point. The header information is then given to the header information analysis unit 65.

The header information analysis unit 65 analyzes the header information to identify a sender from the sender information and receivers from the receiver information (step S35). Then, this analysis result indicating the sender and the receivers is given to the public key acquisition unit 66. Here, the receivers include the electronic mail manager who is added at the management header information adding unit 64. In addition, the header information itself is given to the encrypted electronic mail construction unit 68.

The public key acquisition unit 66 acquires respective public keys of the sender and the receivers (step S36). In an exemplary case of the electronic mail 20, the public keys of the sender S, the receiver A, the receiver B, and the electronic mail manager are going to be acquired. Here, a scheme for acquiring the public keys is not limited to any specific scheme. The acquired public keys are then given to the encryption key encrypting unit 67.

The encryption key encrypting unit 67 encrypts the encryption key generated by the encryption key generation unit 63 according to the public-key cryptography, by using each of the public keys of the receivers, the public key of the sender, and the public key of the electronic mail manager (the management public key) given from the public key acquisition unit 66, so as to produce each receiver's encryption key information, a sender's encryption key information, and a management encryption key information, respectively (step S37). Each encryption key information generated by the encryption key encrypting unit 67 is then given to the encrypted electronic mail construction unit 68.

The encrypted electronic mail construction unit 68 constructs the encrypted electronic mail 70 of a prescribed format by using the encrypted message given from the message encrypting unit 62, the receiver's encryption key information, the sender's encryption key information, and the management encryption key information given from the encryption key encrypting unit 67, and the header information given from the header information analysis unit 65 (step S38), and outputs the constructed encrypted electronic mail 70.

Figure 10:
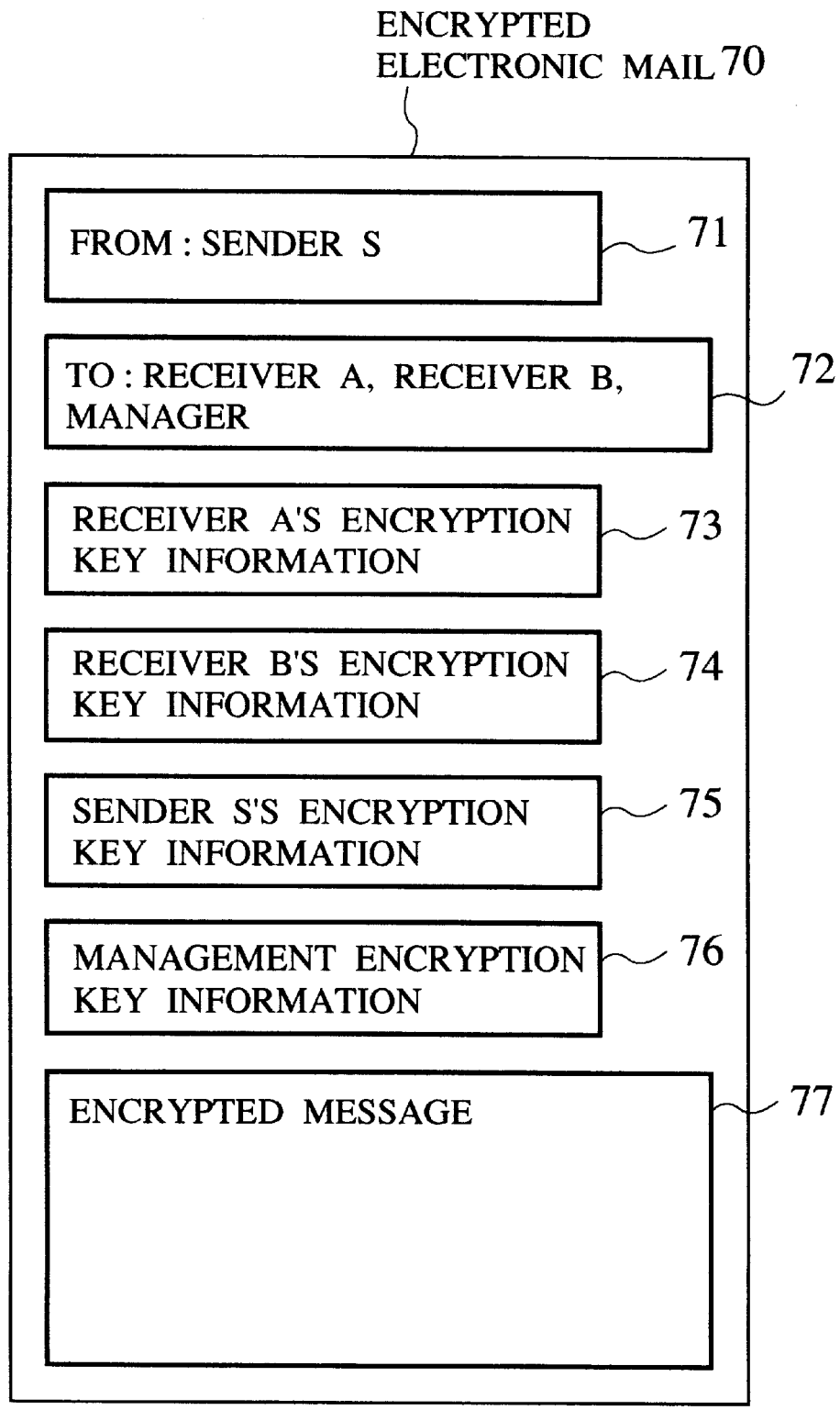
FIG. 10 is a diagram showing a structure of an encrypted electronic mail obtained by the electronic mail encryption apparatus of FIG. 8.

FIG. 10 shows a structure of the encrypted electronic mail 70 obtained by encrypting the electronic mail 20 of FIG. 2 according to the electronic mail encryption processing described above. In FIG. 10, the encrypted electronic mail 70 comprises: the header information including the sender information 71 and the receiver information 72; the electronic mail message encryption key information including a receiver A's encryption key information 73, a receiver B's encryption key information 74, a sender S's encryption key information 75, and a management encryption key information 76; and an encrypted message 77.

Thus the encrypted electronic mail 70 of FIG. 10 which is encrypted by the electronic mail encryption apparatus 60 of FIG. 8 also has the management encryption key information added Just like the first embodiment described above, so that it also becomes possible to realize the information management regarding the encrypted electronic mail by a third person other than the sender and the receivers of the electronic mail Just like the first embodiment described above.

Moreover, the encrypted electronic mail 70 of FIG. 10 differs from the encrypted electronic mail 30 of FIG. 4 in that the electronic mail manager is added to the receiver information. In this manner, the encryption key information for the electronic mail manager is added to this encrypted electronic mail 70. In addition, this encrypted electronic mail 70 is going to be delivered to the electronic mail manager automatically, so that the log of the encrypted electronic mail can be made by the electronic mail manager automatically.

In addition, according to this second embodiment, there is also an advantage in that the information management of the encrypted electronic mails by a third person can be realized without largely changing the framework of the conventional encrypted electronic mails.

Note here that the electronic mail encryption processing to be carried out by the electronic mail encryption apparatus 60 of this second embodiment is not necessarily limited to that shown in FIG. 9 described above, and can be modified in various ways.

Figure 11:
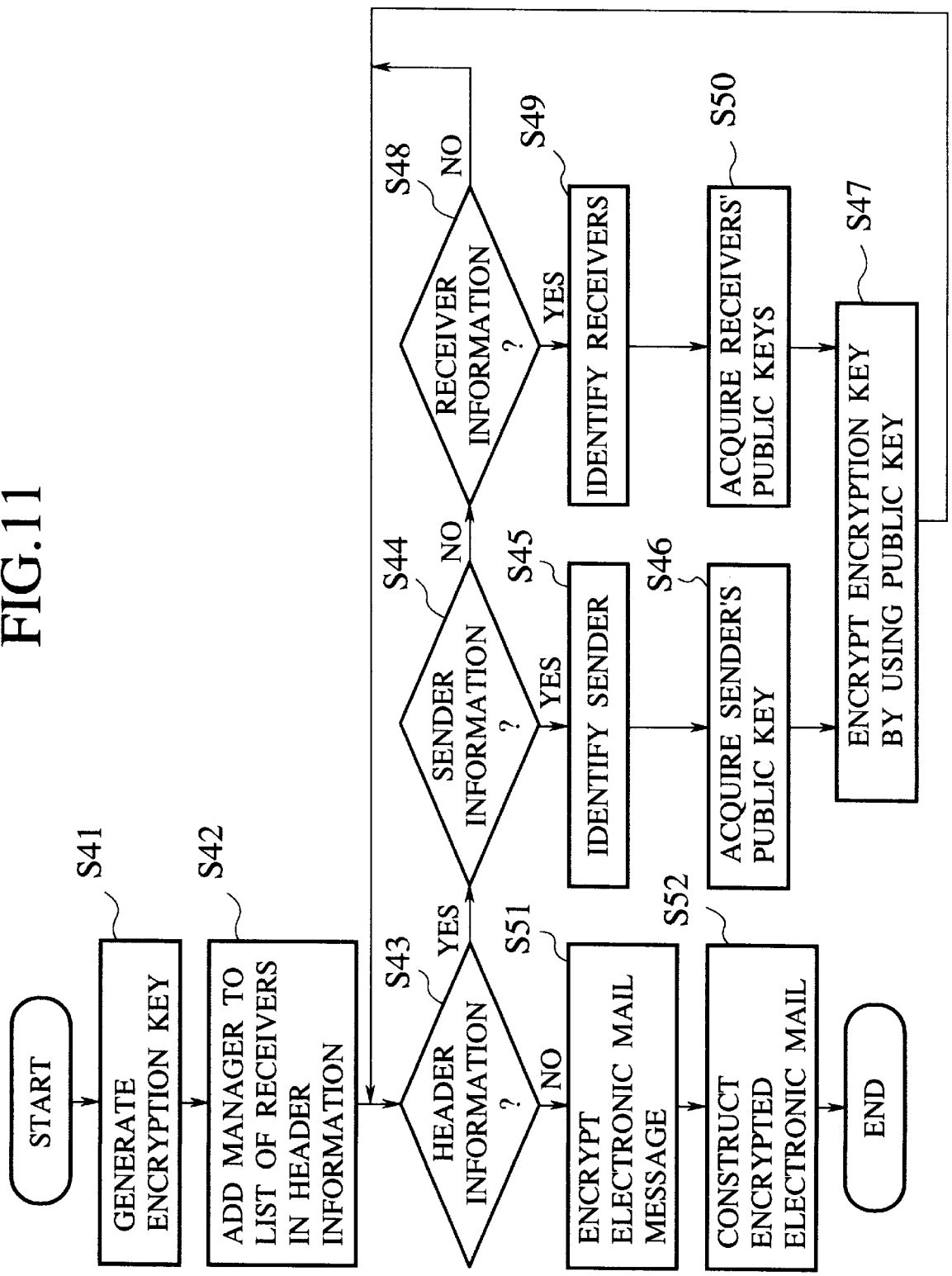
FIG. 11 is a flow chart for another exemplary procedure of an electronic mail encryption processing to be carried out by the electronic mail encryption apparatus of FIG. 8.

For example, FIG. 11 shows another exemplary procedure for an electronic mail encryption processing to be carried out by the electronic mail encryption apparatus 60 shown in FIG. 8. This procedure of FIG. 11 differs from that of FIG. 9 only in an order of processings.

More specifically, in FIG. 9, after the encryption key is generated (step S32), the electronic mail message is encrypted first (step S33). In contrast, in FIG. 11, after the encryption key is generated (step S41), the electronic mail manager is added to a list of receivers of the electronic mail in the receiver information of the header information (step S42), and a type of information to be processed is judged as the header information (step S43), or the sender information (step S44), or the receiver information (step S48). Then, the electronic mail message is encrypted (step S51) immediately before the construction of the encrypted electronic mail in a prescribed format (step S52). Also, in FIG. 9, the sender and the receivers are identified together at once (step S35), the public keys of the sender and the receivers are obtained together at once (step S36), and the message encryption key is encrypted by using the respective public keys together at once (step S37). In contrast, in FIG. 11, the identification of the sender (step S45), the acquisition of the sender's public key (step S46), and the encryption of the message encryption key by using the sender's public key (step S47) are carried out in series, while the identification of the receivers (step S49), the acquisition of the receivers' public keys (step S50), and the encryption of the message encryption key by using each of the receivers' public keys including the management public key (step S47) are carried out in series.

Besides this modification of FIG. 11, many modifications and variations of the procedure of FIG. 9 can be made without departing from the novel and advantageous features of this second embodiment as should be obvious to those skilled in the art. Consequently, the detailed descriptions of all the other possible modifications and variations will be omitted here.

Note also that the electronic mail encryption apparatus of this second embodiment can be realized by hardware, or by software program implementing the above described processing content which is to be installed and executed on a computer.

Figure 12:
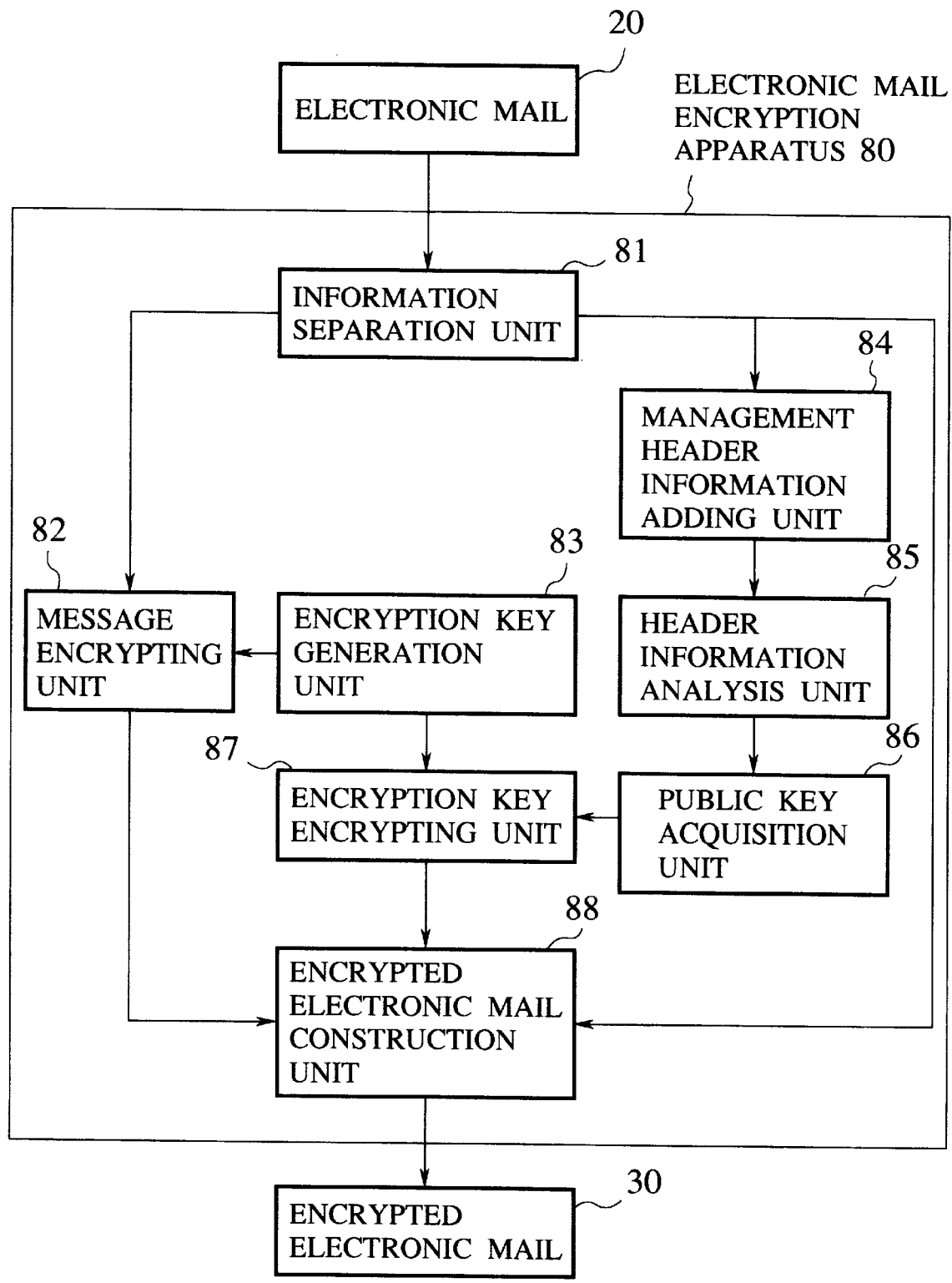
FIG. 12 is a block diagram of an electronic mail encryption apparatus according to the third embodiment of the present invention.

Referring now to FIG. 12, the third embodiment of the present invention which is directed to a method and an apparatus for encrypting electronic mails will be described in detail.

FIG. 12 shows a basic configuration of an electronic mail encryption apparatus 80 according to this third embodiment which encrypts an entered electronic mail 20 and outputs an encrypted electronic mail 30.

In this electronic mail encryption apparatus 80, an information separation unit 81, a message encrypting unit 82, an encryption key generation unit 83, a management header information adding unit 84, a header information analysis unit 85, a public key acquisition unit 86, an encryption key encrypting unit 87, and an encrypted electronic mail construction unit 88 are substantially similar to the corresponding elements in the configuration of FIG. 8 for the second embodiment described above.

This configuration of FIG. 12 differs from that of FIG. 8 in that the header information separated by the information separation unit 81 is directly given to the management header information adding unit 84 as well as to the encrypted electronic mail construction unit 88

A procedure for an electronic mail encryption processing to be carried out by the electronic mail encryption apparatus 80 shown in FIG. 12 is basically similar to that of FIG. 9 or FIG. 11 for the second embodiment described above. Of course, similarly as in the second embodiment, many modifications and variations of the procedure for an electronic mail encryption processing can be made without departing from the novel and advantageous features of this third embodiment as should be obvious to those skilled in the art.

This third embodiment differs from the second embodiment in that, since the header information separated by the information separation unit 81 is directly given to the encrypted electronic mail construction unit 88, the electronic mail manager is included in the receiver information of the header information given to the header information analysis unit 85, but not in the receiver information of the header information given to the encrypted electronic mail construction unit 88.

Consequently, in this third embodiment, the encrypted electronic mail 30 similar to that shown in FIG. 4 for the first embodiment can be constructed and outputted.

As should be apparent, the encrypted electronic mail 30 which is encrypted by the electronic mail encryption apparatus 80 of FIG. 12 also has the management encryption key information added just like the first and second embodiments described above, so that it also becomes possible to realize the information management regarding the encrypted electronic mail by a third person other than the sender and the receivers of the electronic mail just like the first and second embodiments described above.

In addition, according to this third embodiment, there is also an advantage in that the information management of the encrypted electronic mails by a third person can be realized without largely changing the framework of the conventional encrypted electronic mails.

It should also be apparent that the electronic mail encryption apparatus of this third embodiment can be realized by hardware, or by software program implementing the above described processing content which is to be installed and executed on a computer.

It is to be noted that the encrypted electronic mail similar to that of FIG. 4 can also be constructed by modifying the second embodiment described above in such a manner that the manager is deleted from the receiver information of the header information at a time of constructing the encrypted electronic mail.

Figure 13:
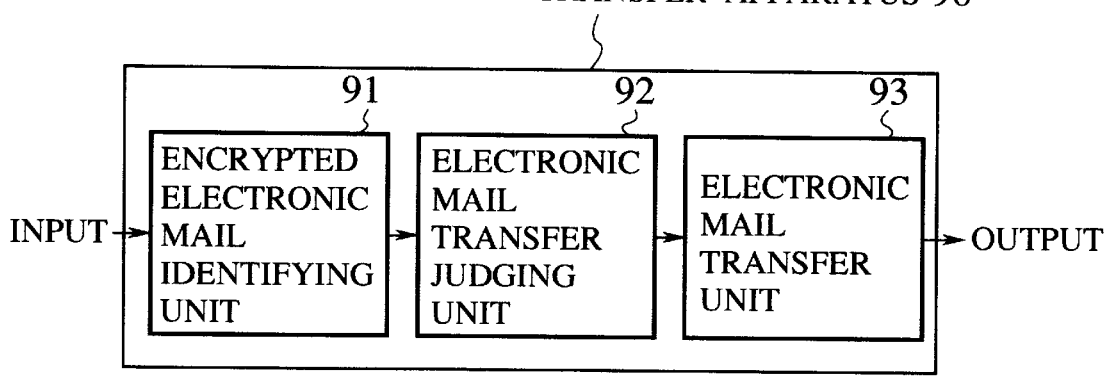
FIG. 13 is a block diagram of an electronic mail transfer apparatus according to the fourth embodiment of the present invention.
Figure 14:
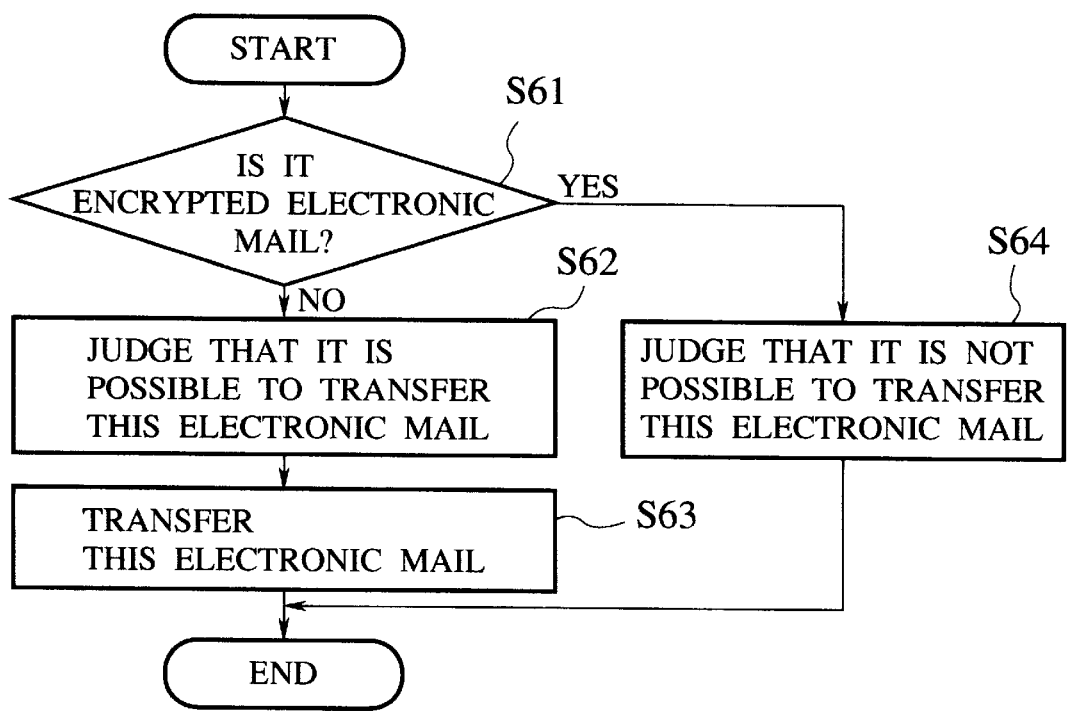
FIG. 14 is a flow chart for one exemplary procedure of an electronic mail transfer processing to be carried out by the electronic mail transfer apparatus of FIG. 13.
Figure 15:
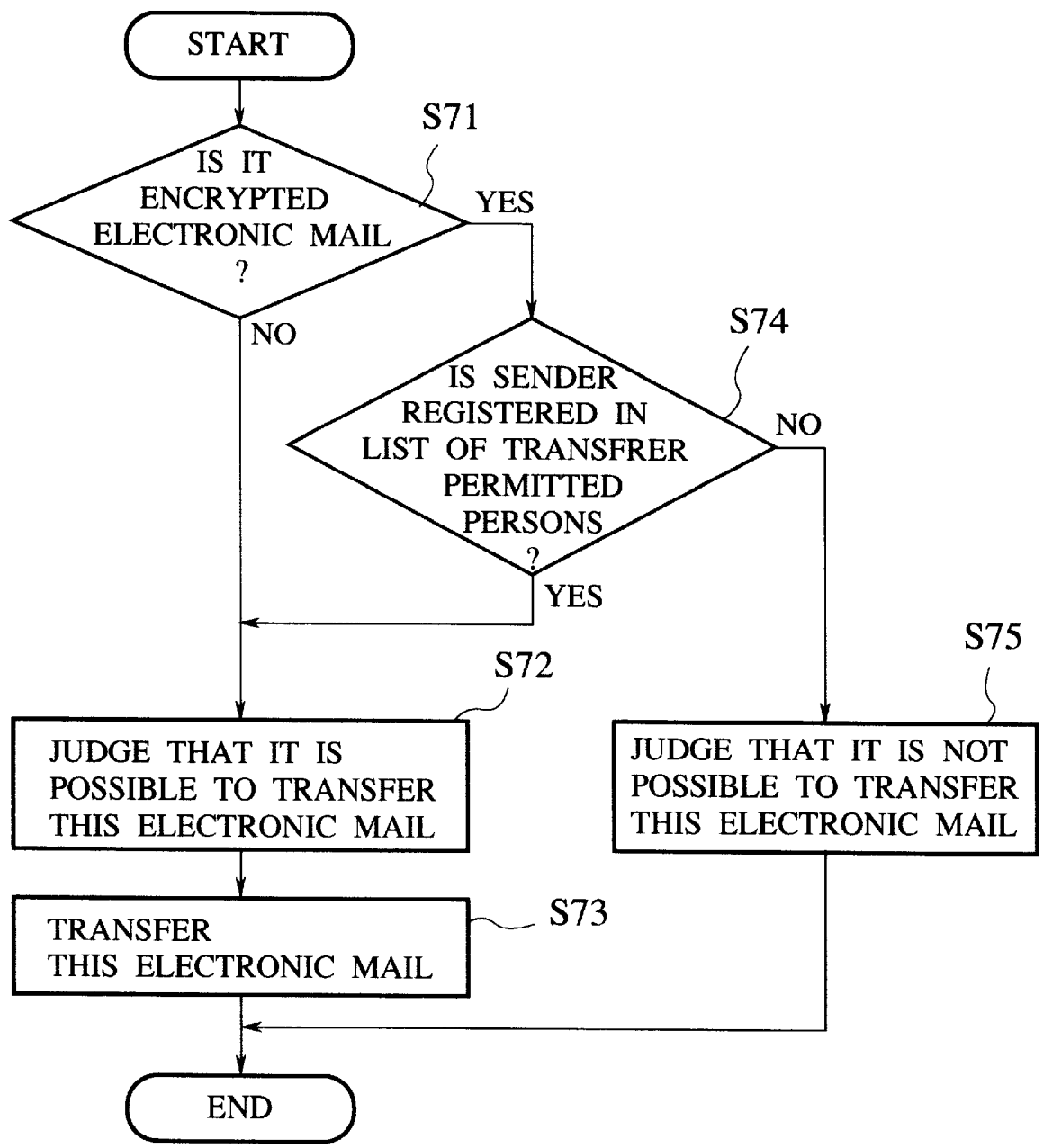
FIG. 15 is a flow chart for another exemplary procedure of an electronic mail transfer processing to be carried out by the electronic mail transfer apparatus of FIG. 13.

Referring now to FIG. 13 to FIG. 15, the fourth embodiment of the present invention which is directed to a method and an apparatus for transferring electronic mails will be described in detail.

FIG. 13 shows a basic configuration of an electronic mail transfer apparatus 90 according to this fourth embodiment which has a function to limit transfer of encrypted electronic mails.

This electronic mail transfer apparatus 90 comprises: an encrypted electronic mail identifying unit 91; an electronic mail transfer judging unit 92 connected with the encrypted electronic mail identifying unit 91; and an electronic mail transfer unit 93 connected with the electronic mail transfer judging unit 92.

For a scheme to limit the transfer of encrypted electronic mails, there are many possible options, including the following, for example.

(1) A scheme which does not permit the transfer for every encrypted electronic mail.

(2) A scheme which permits the transfer only for those encrypted electronic mails which satisfy a prescribed condition. For example, a list of transfer permitted persons who can transfer the encrypted electronic mails is provided in advance, and the transfer is permitted only when the sender is registered in that list.

FIG. 14 shows an exemplary procedure for an electronic mail transfer processing to realize the above transfer limiting scheme (1) by the electronic mail transfer apparatus 90 of FIG. 13, which proceeds as follows.

For each electronic mail entered into the electronic mail transfer apparatus 90, the encrypted electronic mail identifying unit 91 judges whether this entered electronic mail is the encrypted electronic mail or not (step S61). There are many possible methods for identifying the encrypted electronic mail here. For example, in a case of the encrypted electronic mail, an information indicating that it is the encrypted electronic mail is contained in the header information or a part of the message, so that the encrypted electronic mail can be identified by checking whether such an information is contained in the entered electronic mail. The result obtained by this encrypted electronic mail identifying unit 91 is then given to the electronic mail transfer judging unit 92.

The electronic mail transfer judging unit 92 judges whether it is permitted to transfer the entered electronic mail according to the result obtained by the encrypted electronic mail identifying unit 91. In this fourth embodiment, the electronic mail transfer judging unit 92 judges that it is possible to transfer the entered electronic mail when the entered electronic mail is not the encrypted electronic mail (step S62), and that it is not possible to transfer the entered electronic mail when the entered electronic mail is the encrypted electronic mail (step S64).

The entered electronic mail whose transfer is judged as permitted by the electronic mail transfer judging unit 92 is then given to the electronic mail transfer unit 93, and actually transferred therefrom (step S63). The electronic mail transfer unit 93 has a function similar to that of the known electronic mail transfer scheme which should be well known to those skilled in the art and therefore its description will be omitted here.

FIG. 15 shows an exemplary procedure for an electronic mail transfer processing to realize the above transfer limiting scheme (2) by the electronic mail transfer apparatus 90 of FIG. 13, which proceeds as follows.

For each electronic mail entered into the electronic mail transfer apparatus 90, the encrypted electronic mail identifying unit 91 judges whether this entered electronic mail is the encrypted electronic mail or not (step S71). There are many possible methods for identifying the encrypted electronic mail here. For example, in a case of the encrypted electronic mail, an information indicating that it is the encrypted electronic mail is contained in the header information or a part of the message, so that the encrypted electronic mail can be identified by checking whether such an information is contained in the entered electronic mail. The result obtained by this encrypted electronic mail identifying unit 91 is then given to the electronic mail transfer judging unit 92.

The electronic mail transfer judging unit 92 judges whether it is permitted to transfer the entered electronic mail according to the result obtained by the encrypted electronic mail identifying unit 91. In this case, it is assumed that a list of transfer permitted persons who can transfer the encrypted electronic mails is provided in advance.

The electronic mail transfer judging unit 92 judges that it is possible to transfer the entered electronic mail when the entered electronic mail is not the encrypted electronic mail (step S72). On the other hand, when the entered electronic mail is the encrypted electronic mail, the sender information in the header information of the entered electronic mail is referred, and whether the sender indicated therein is registered in the list of transfer permitted persons or not is judged (step S74). Then, the electronic mail transfer judging unit 92 judges that it is possible to transfer the entered electronic mail when the sender is registered in that list (step S74 YES, step S72), or that it is not possible to transfer the entered electronic mail when the sender is not registered in that list (step S74 NO, step S75).

The entered electronic mail whose transfer is judged as permitted by the electronic mail transfer judging unit 92 is then given to the electronic mail transfer unit 93, and actually transferred therefrom (step S73).

Note that, besides these two schemes of FIG. 14 and FIG. 15, it is possible to devise many other possible options for a scheme to limit the transfer of encrypted electronic mails without departing from the novel and advantageous features of this fourth embodiment as should be obvious to those skilled in the art.

Thus according to this fourth embodiment, it becomes possible to realize the transfer control regarding encrypted electronic mails.

Figure 16:
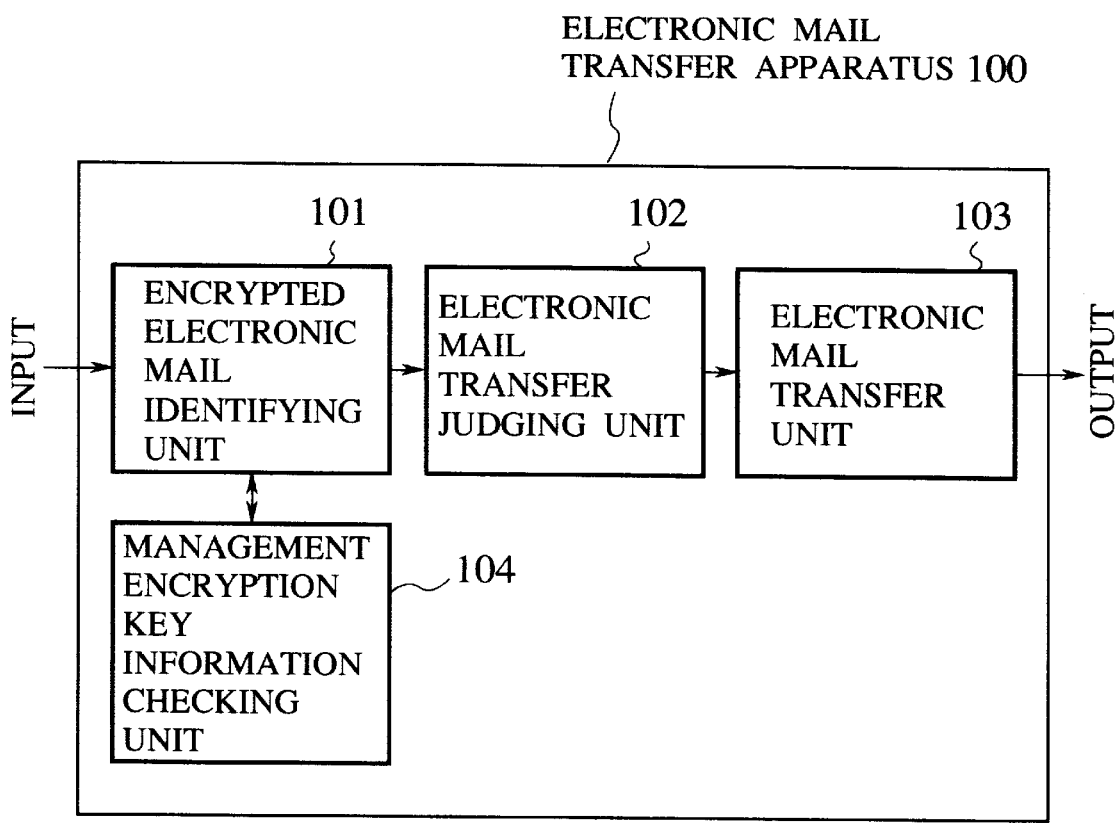
FIG. 16 is a block diagram of an electronic mail transfer a apparatus according to the fifth embodiment of the present invention.
Figure 17:
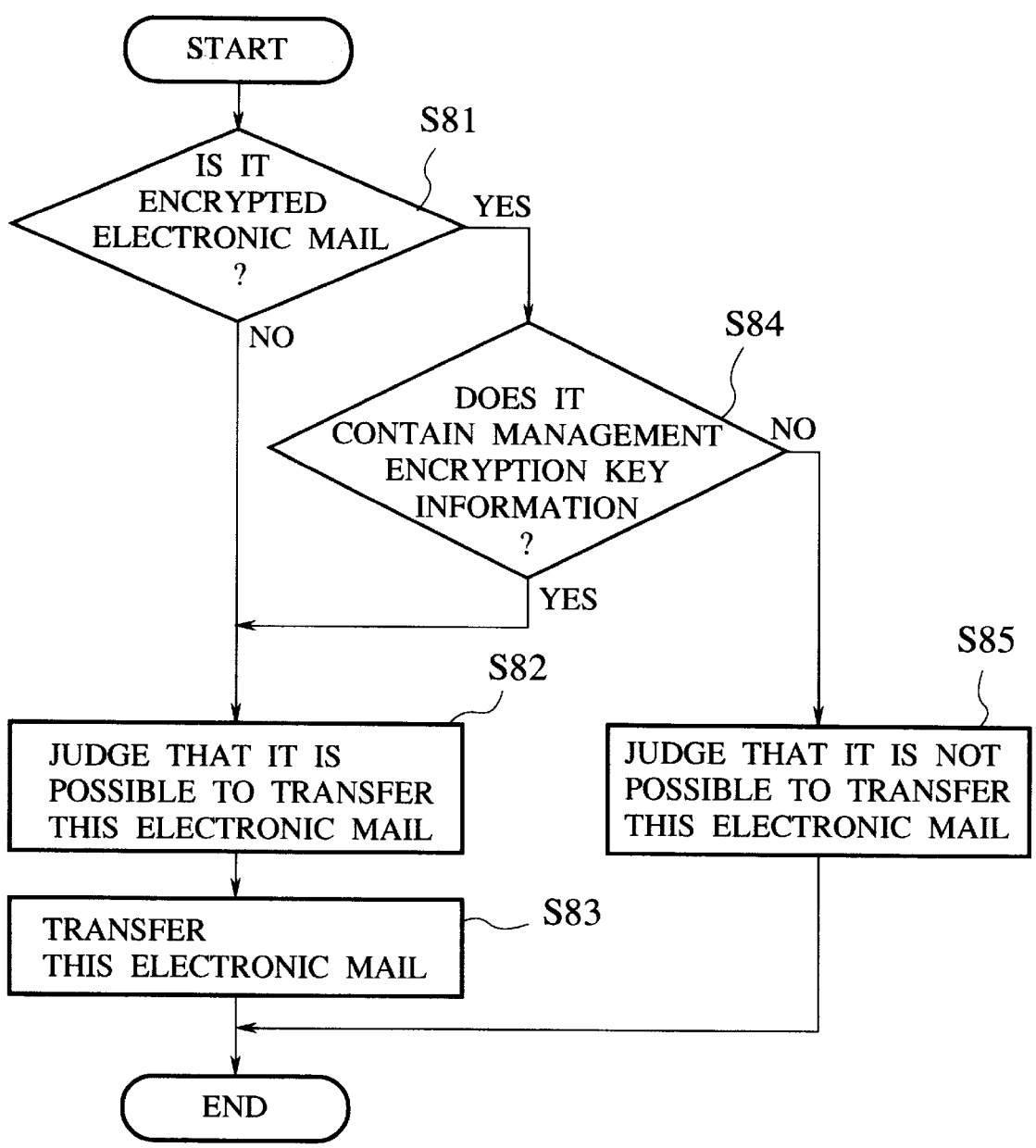
FIG. 17 is a flow chart for one exemplary procedure of an electronic mail transfer processing to be carried out by the electronic mail transfer apparatus of FIG. 16.

Referring now to FIG. 16 and FIG. 17, the fifth embodiment of the present invention which is directed to a method and an apparatus for transferring electronic mails will be described in detail.

FIG. 16 shows a basic configuration of an electronic mail transfer apparatus 100 according to this fifth embodiment which has a function to transfer those encrypted electronic mails which contain the management encryption key information, and not to transfer those encrypted electronic mails which do not contain the management encryption key information.

This electronic mail transfer apparatus 100 comprises: an encrypted electronic mail identifying unit 101; an electronic mail transfer judging unit 102 connected with the encrypted electronic mail identifying unit 101; an electronic mail transfer unit 103 connected with the electronic mail transfer judging unit 102; and a management encryption key information checking unit 104 connected with the encrypted electronic mail identifying unit 101.

FIG. 17 shows an exemplary procedure for an electronic mail transfer processing to be carried out by the electronic mail transfer apparatus 100 of FIG. 16, which proceeds as follows.

For each electronic mail entered into the electronic mail transfer apparatus 100, the encrypted electronic mail identifying unit 101 Judges whether this entered electronic mail is the encrypted electronic mail or not (step S81). There are many possible methods for identifying the encrypted electronic mail here. Just as in the fourth embodiment described above. For example, in a case of the encrypted electronic mail, an information indicating that it is the encrypted electronic mail is contained in the header information or a part of the message, so that the encrypted electronic mail can be identified by checking whether such an information is contained in the entered electronic mail.

When the entered electronic mail is identified as the encrypted electronic mail, the management encryption key information checking unit 104 checks whether this encrypted electronic mail properly contains the management encryption key information or not (step S84). There are many possible methods for checking whether the encryption key information is contained or not here. For example, it can be checked by scanning through the encrypted electronic mail to see whether the management encryption key information is contained therein. As another example, by including a special identifier in the header information of the encrypted electronic mail which contains the management encryption key information, it can also be checked by checking whether the header information contains that special identifier or not.

The encrypted electronic mail identifying unit 101 receives the result obtained by the management encryption key information checking unit 104, and the result obtained by the encrypted electronic mail identifying unit 101 and the management encryption key information checking unit 104 is then given to the electronic mail transfer Judging unit 102.

The electronic mail transfer Judging unit 102 Judges whether it is permitted to transfer the entered electronic mail according to the result given from the encrypted electronic mail identifying unit 101. In this fifth embodiment, the electronic mail transfer judging unit 102 judges that it is possible to transfer the entered electronic mail when the entered electronic mail is not the encrypted electronic mail (step S82). On the other hand, when the entered electronic mail is the encrypted electronic mail, depending on whether the management encryption key information is contained in this encrypted electronic mail or not (step S84), the electronic mail transfer judging unit 102 judges that it is possible to transfer the entered electronic mail when it is the encrypted electronic mail which contains the management encryption key information (step S84 YES, step S82), or that it is not possible to transfer the entered electronic mail when it is the encrypted electronic mail which does not contain the management encryption key information (step S84 NO, step S85).

The entered electronic mail whose transfer is judged as permitted by the electronic mail transfer judging unit 102 is then given to the electronic mail transfer unit 103, and actually transferred therefrom (step S83). The electronic mail transfer unit 103 has a function similar to that of the known electronic mail transfer scheme which should be well known to those skilled in the art and therefore its description will be omitted here.

By providing the electronic mail transfer apparatus of this fifth embodiment at a boundary of an interior of the company and the outside world, it becomes possible to realize the transfer control regarding encrypted electronic mails such that the transfer of the encrypted electronic mail which does not contain the management encryption key information, that is, the encrypted electronic mail for which the information management by the electronic mail manager cannot be made, to the outside of the company can be prevented, for example.

Note that the encrypted electronic mails having the management encryption key information which are to be transferred in this fifth embodiment can be those obtained by the method and the apparatus for encrypting electronic mails as described in the first, second, or third embodiment described above.

Figure 18:
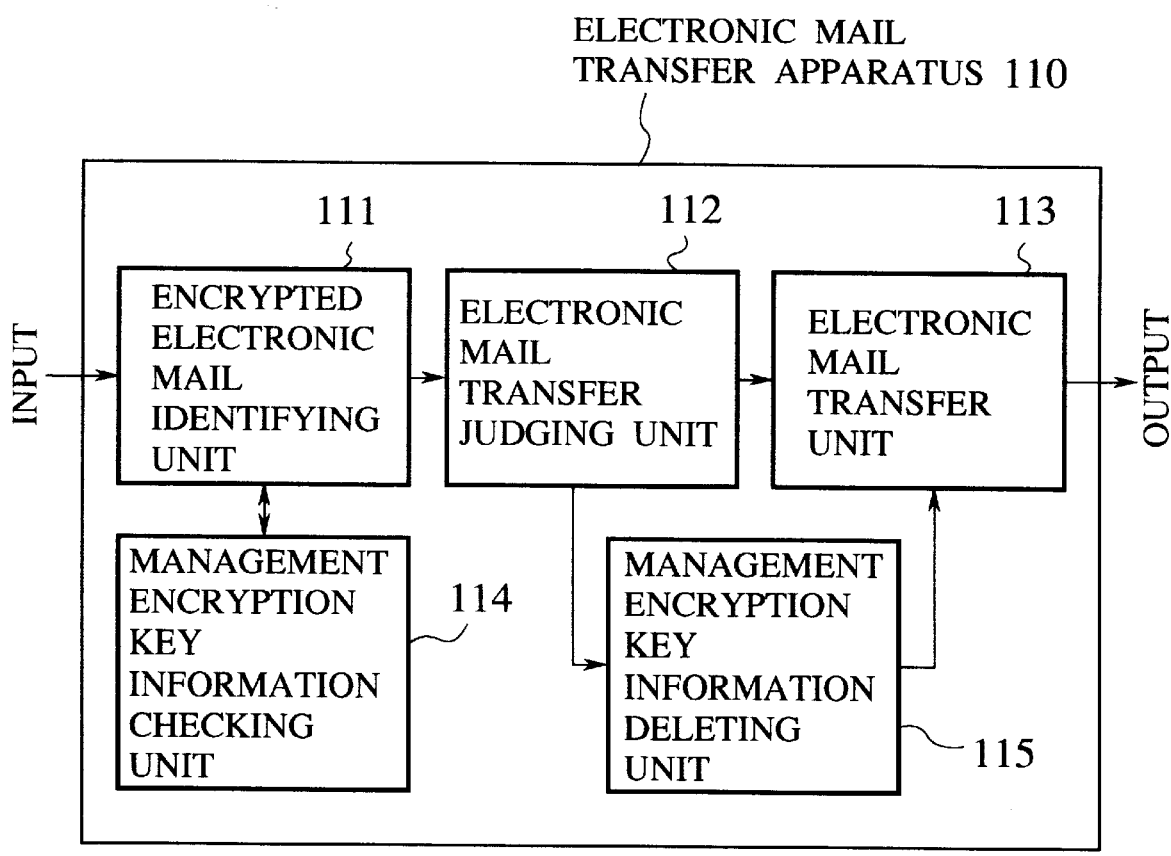
FIG. 18 is a block diagram of an electronic mail transfer apparatus according to the sixth embodiment of the present invention.
Figure 19:
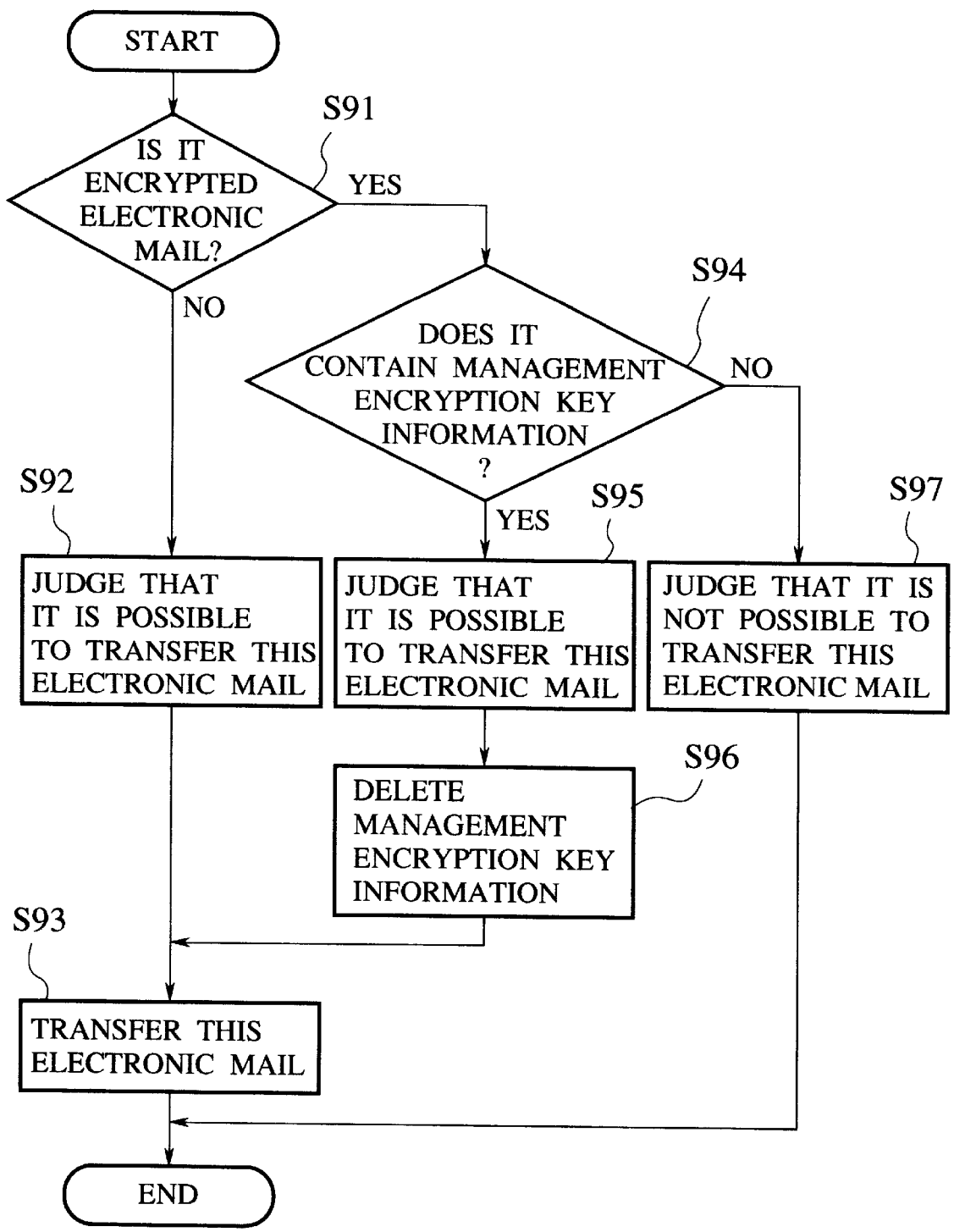
FIG. 19 is a flow chart for one exemplary procedure of an electronic mail transfer processing to be carried out by the electronic mail transfer apparatus of FIG. 18.

Referring now to FIG. 18 and FIG. 19, the sixth embodiment of the present invention which is directed to a method and an apparatus for transferring electronic mails will be described in detail.

FIG. 18 shows a basic configuration of an electronic mail transfer apparatus 110 according to this sixth embodiment which has a function to delete the management encryption key information at a time of actually transferring the encrypted electronic mail.

This electronic mail transfer apparatus 110 comprises: an encrypted electronic mail identifying unit 111; an electronic mail transfer judging unit 112 connected with the encrypted electronic mail identifying unit 111; an electronic mail transfer unit 113 connected with the electronic mail transfer judging unit 112; a management encryption key information checking unit 114 connected with the encrypted electronic mail identifying unit 111; and a management encryption key information deleting unit 115 connected with the electronic mail transfer judging unit 112 and the electronic mail transfer unit 113.

FIG. 19 shows an exemplary procedure for an electronic mail transfer processing to be carried out by the electronic mail transfer apparatus 110 of FIG. 18, which proceeds as follows.

For each electronic mail entered into the electronic mail transfer apparatus 110, the encrypted electronic mail identifying unit 111 judges whether this entered electronic ail is the encrypted electronic mail or not (step S91), here are many possible methods for identifying the encrypted electronic mail here. Just as in the fourth embodiment described above. For example, in a case of the encrypted electronic mail, an information indicating that it is the encrypted electronic mail is contained in the header information or a part of the message, so that the encrypted electronic mail can be identified by checking whether such an information is contained in the entered electronic mail.

When the entered electronic mail is identified as the encrypted electronic mail, the management encryption key information checking unit 114 checks whether this encrypted electronic mail properly contains the management encryption key information or not (step S94). Here, the same method for checking whether the encryption key information is contained or not as in the fifth embodiment described above can be used.

The encrypted electronic mail identifying unit 111 receives the result obtained by the management encryption key information checking unit 114, and the result obtained by the encrypted electronic mail identifying unit 111 and the management encryption key information checking unit 114 is then given to the electronic mail transfer judging unit 112.

The electronic mail transfer judging unit 112 judges whether it is permitted to transfer the entered electronic mail according to the result given from the encrypted electronic mail identifying unit 111.

In this sixth embodiment, the electronic mail transfer judging unit 112 judges that it is possible to transfer the entered electronic mail when the entered electronic mail is not the encrypted electronic mail (step S92), and this entered electronic mail is then given to the electronic mail transfer unit 113.

On the other hand, when the entered electronic mail is the encrypted electronic mail, depending on whether the management encryption key information is contained in this encrypted electronic mail or not (step S94), the electronic mail transfer judging unit 112 judges that it is possible to transfer the entered electronic mail when it is the encrypted electronic mail which contains the management encryption key information (step S94 YES, step S95), or that it is not possible to transfer the entered electronic mail when it is the encrypted electronic mail which does not contain the management encryption key information (step S94 NO, step S97). The encrypted electronic mail whose transfer is judged as permitted by the electronic mail transfer judging unit 112 is then given to the management encryption key information deleting unit 115.

The management encryption key information deleting unit 115 deletes the management encryption key information from the encrypted electronic mail given from the electronic mail transfer judging unit 112 (step S96), and this encrypted electronic mail is then given to the electronic mail transfer unit 113.

The entered electronic mail whose transfer is judged as permitted by the electronic mail transfer judging unit 112 is then actually transferred from the electronic mail transfer unit 113 (step S93). The electronic mail transfer unit 113 has a function similar to that of the known electronic mail transfer scheme which should be well known to those skilled in the art and therefore its description will be omitted here.

According to this sixth embodiment, the management encryption key information added by the electronic mail encryption apparatus of any of the first to third embodiments described above can be deleted from the encrypted electronic mail. This management encryption key information is an information which is necessary only for the information management within a particular organization, and therefore which is essentially unnecessary for the sender and the receivers of the electronic mail. By using the electronic mail transfer apparatus of this sixth embodiment, such an information for the management purpose only can be deleted from the encrypted electronic mail at a time of actually transferring the encrypted electronic mail.

Note that the encrypted electronic mails having the management encryption key information which are to be transferred in this sixth embodiment can be those obtained by the method and the apparatus for encrypting electronic mails as described in the first, second, or third embodiment described above.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An electronic mail encryption apparatus, comprising:
   message encrypting means for encrypting a message of an electronic mail according to a secret-key cryptography by using an encryption key, to produce an encrypted message;
   encryption key encrypting means for encrypting the encryption key according to a public-key cryptography by using each one of public keys of a sender and receivers of the electronic mail and a management public key corresponding to an electronic mail manager, to respectively produce encryption key information for each one of the sender and the receivers of the electronic mail and a management encryption key information; and
   encrypted electronic mail constructing means for constructing an encrypted electronic mail by using the encrypted message, the encryption key information for each one of the sender and the receivers of the electronic mail, and the management encryption key information.

2. The apparatus of claim 1, further comprising:
   public key acquisition means for acquiring the public keys of the sender and the receivers of the electronic mail according to a header information of the electronic mail; and management public key acquisition means for acquiring the prescribed management public key independently from the public key acquisition means.

3. The apparatus of claim 1, further comprising:

management header information adding means for adding the electronic mail manager to a receiver information in a header information of the electronic mail.

4. The apparatus of claim 3, further comprising:

public key acquisition means for acquiring the public keys of the sender and the receivers of the electronic mail and the prescribed management public key according to the header information of the electronic mail to which the electronic mail manager is added by the management header information adding means.

5. The apparatus of claim 3, wherein the encrypted electronic mail constructing means constructs the encrypted electronic mail by also using the header information of the electronic mail to which the electronic mail manager is added by the management header information adding means.

6. The apparatus of claim 3, wherein the encrypted electronic mail constructing means constructs the encrypted electronic mail by also using the header information of the electronic mail to which the electronic mail manager is not yet added by the management header information adding means.

7. A method for encrypting an electronic mail, comprising the steps of:

(a) encrypting a message of the electronic mail according to a secret-key cryptography by using an encryption key, to produce an encrypted message;

(b) encrypting the encryption key according to a public-key cryptography by using each one of public keys of a sender and receivers of the electronic mail and a management public key corresponding to an electronic mail manager, to respectively produce encryption key information for each one of the sender and the receivers of the electronic mail and a management encryption key information; and (c) constructing an encrypted electronic mail by using the encrypted message produced at the step (a), and the encryption key information for each one of the sender and the receivers of the electronic mail and the management encryption key information produced at the step (b).

8. The method of claim 7, further comprising the steps of:

(d) acquiring the public keys of the sender and the receivers of the electronic mail according to a header information of the electronic mail; and (e) acquiring the prescribed management public key independently from the step (d).

9. The method of claim 7, further comprising the step of:

(f) adding the electronic mail manager to a receiver information in a header information of the electronic mail.

10. The method of claim 9, further comprising the steps of:

(g) acquiring the public keys of the sender and the receivers of the electronic mail and the prescribed management public key according to the header information of the electronic mail to which the electronic mail manager is added by the step (f).

11. The method of claim 9, wherein the step (c) constructs the encrypted electronic mail by also using the header information of the electronic mail to which the electronic mail manager is added by the step (g).

12. The method of claim 9, wherein the step (c) constructs the encrypted electronic mail by also using the header information of the electronic mail to which the electronic mail manager is not yet added by the step (g).

13. An electronic mail encryption and transfer apparatus, comprising:

message encrypting means for encrypting a message of an electronic mail according to a secret-key cryptography by using an encryption key, to produce an encrypted message;

encryption key encrypting means for encrypting the encryption key according to a public-key cryptography by using each one of public keys of a sender and receivers of the electronic mail and a management public key corresponding to an electronic mail manager, to respectively produce encryption key information for each one of the sender and the receivers of the electronic mail and a management encryption key information;

encrypted electronic mail constructing means for constructing an encrypted electronic mail by using the encrypted message, the encryption key information for each one of the sender and the receivers of the electronic mail, and the management encryption key information; and transfer means for transferring said encrypted electronic mail constructed by the encrypted electronic mail constructing means by checking whether said encrypted electronic mail contains the management encryption key information or not, and judging that a transfer of said encrypted electronic mail to be transferred is permitted unless said encrypted electronic mail is found to be not containing the management encryption key information.

14. A method for encrypting and transferring an electronic mail, comprising the steps of:

(a) encrypting a message of the electronic mail according to a secret-key cryptography by using an encryption key, to produce an encrypted message;

(b) encrypting the encryption key according to a public-key cryptography by using each one of public keys of a sender and receivers of the electronic mail and a management public key corresponding to an electronic mail manager, to respectively produce encryption key information for each one of the sender and the receivers of the electronic mail and a management encryption key information;

(c) constructing an encrypted electronic mail by using the encrypted message produced at the step (a), and the encryption key information for each one of the sender and the receivers of the electronic mail and the management encryption key information produced at the step (b); and (d) transferring said encrypted electronic mail constructed at the step (c) by checking whether said encrypted electronic mail contains the management encryption key information or not, and judging that a transfer of said encrypted electronic mail to be transferred is permitted unless said encrypted electronic mail is found to be not containing the management encryption key information.

* * * * *